US010970765B2

(12) United States Patent
Fang et al.

(10) Patent No.: US 10,970,765 B2
(45) Date of Patent: Apr. 6, 2021

(54) GENERATING USER-CUSTOMIZED ITEMS USING A VISUALLY-AWARE IMAGE GENERATION NETWORK

(71) Applicants: Adobe Inc., San Jose, CA (US); The Regents of the University of California, Oakland, CA (US)

(72) Inventors: Chen Fang, Hanover, NH (US); Zhaowen Wang, San Jose, CA (US); Wangcheng Kang, San Diego, CA (US); Julian McAuley, San Diego, CA (US)

(73) Assignees: ADOBE INC., San Jose, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 345 days.

(21) Appl. No.: 15/897,856

(22) Filed: Feb. 15, 2018

(65) Prior Publication Data
US 2019/0251612 A1 Aug. 15, 2019

(51) Int. Cl.
*G06Q 30/00* (2012.01)
*G06Q 30/06* (2012.01)
*G06N 3/08* (2006.01)
*G06F 16/532* (2019.01)

(52) U.S. Cl.
CPC ....... *G06Q 30/0621* (2013.01); *G06F 16/532* (2019.01); *G06N 3/08* (2013.01)

(58) Field of Classification Search
None
See application file for complete search history.

(56) References Cited

U.S. PATENT DOCUMENTS

| 8,301,623 | B2 * | 10/2012 | Chakrabarti | G06F 16/9535 707/723 |
|---|---|---|---|---|
| 10,572,823 | B1 * | 2/2020 | Feinman | G06F 21/56 |
| 10,586,310 | B2 * | 3/2020 | Vogels | G06K 9/4628 |
| 2015/0169982 | A1 * | 6/2015 | Perry | G06K 9/6256 382/195 |
| 2015/0248618 | A1 * | 9/2015 | Johnson | G06F 16/635 706/46 |
| 2017/0185894 | A1 * | 6/2017 | Volkovs | G06N 3/08 |
| 2018/0247183 | A1 * | 8/2018 | Kanebako | G06N 5/046 |

(Continued)

OTHER PUBLICATIONS

Ashok Goel et al; "Proceedings of the Eighth International Conference on Computational Creativity"; Jun. 23, 2017; Association for Computational Creativity (Year: 2017).*

(Continued)

*Primary Examiner* — Jason B Dunham
*Assistant Examiner* — Norman Donald Sutch, Jr.
(74) *Attorney, Agent, or Firm* — Keller Jolley Preece

(57) ABSTRACT

The present disclosure relates to a personalized fashion generation system that synthesizes user-customized images using deep learning techniques based on visually-aware user preferences. In particular, the personalized fashion generation system employs an image generative adversarial neural network and a personalized preference network to synthesize new fashion items that are individually customized for a user. Additionally, the personalized fashion generation system can modify existing fashion items to tailor the fashion items to a user's tastes and preferences.

20 Claims, 17 Drawing Sheets

(56) References Cited

U.S. PATENT DOCUMENTS

| | | | | |
|---|---|---|---|---|
| 2019/0130278 A1* | 5/2019 | Karras | ............. | G06N 3/082 |
| 2020/0193661 A1* | 6/2020 | Kaneko | ............. | G06T 11/40 |

OTHER PUBLICATIONS

Jun-Yan Zhu; "Learning to Synthesize and Manipulate Natural Images"; Dec. 14, 2017; Electrical Engineering and Computer Sciences University of California at Berkeley; Technical Report No. UCB/EECS-2017-214 http://www2.eecs.berkeley.edu/Pubs/TechRpts/2017/EECS-2017-214.html (Year: 2017).*

Zheng Qin, "Introduction to E-commerce", 2009, Springer, springer.com (Year: 2009).*

Reference U-2: Jun-Yan Zhu et al; "Generative Visual Manipulation on the Natural Image Manifold"; Sep. 25, 2016; UC Berkeley (Year: 2016).*

Reference V-2: Ian J. Goodfellow et al; "Generative Adversarial Nets"; Jun. 10, 2014; University of Montreal (Year: 2014).*

Reference W-2: Marc'Aurelio Ranzato et al; "Modeling Natural Images Using Gated MRFs"; Sep. 2013; IEEE; vol. 35, No. 9 (Year: 2013).*

Jaime Deverall et al; "Using Generative Adversarial Networks to Design Shoes: The Preliminary Steps"; Jun. 13, 2017 (Year: 2017).*

Steffen Rendle, Christoph Freudenthaler, Zeno Gantner and Lars Schmidt-Thieme. BPR: Bayesian Personalized Ranking from Implicit Feedback. In UAI 2009.

Ruining He and Julian McAuley. VBPR: Visual Bayesian Personalized Ranking from Implicit Feedback. In AAAI 2016.

Augustus Odena, Christopher Olah and Jonathon Shlens. Conditional Image Synthesis With Auxiliary Classifier GANs. In ICML 2017.

Scott Reed, Zeynep Akata, Xinchen Yan, Lajanugen Logeswaran, Bernt Schiele and Honglak Lee. Generative Adversarial Text to Image Synthesis. In ICML 2016.

Ian J. Goodfellow, Jean Pouget-Abadie, Mehdi Mirza, Bing Xu, David Warde-Farley, Sherjil Ozair, Aaron Courville and Yoshua Bengio. Generative Adversarial Networks. In NIPS 2014.

* cited by examiner

GENERATING USER-CUSTOMIZED ITEMS USING A VISUALLY-AWARE IMAGE GENERATION NETWORK

BACKGROUND

Recent years have seen a rapid increase in the use of computing devices in the area of fashion. Indeed, it is now commonplace for individuals and businesses to use computing devices to design, share, make, sell, and manage fashion items such as articles of clothing and accessories. Moreover, modern computing devices have enabled a large selection of fashion items to users desiring to buy, view, or follow these fashion items.

With the increase in the availability of fashion items comes the challenge of identifying and providing users with personalized recommendations. For at least the reasons provided below, conventional recommendation systems struggle in the area and domain of personalized fashion recommendation. As one example, conventional systems rely on semantics rather than visual signals to determine what is 'fashionable.' However, like fashion items themselves, fashion semantics are very complex and varied. For example, in some cases, the same semantics describe different fashion features. In other cases, different semantics describe the same fashion feature.

Compounding the issue of semantic complexity, conventional systems struggle with fashion recommendations as fashion trends are tremendously diverse and each user can have unique fashion preferences. Furthermore, fashion trends also change relatively quickly. Similarly, a user's personal preferences can also frequently change to match or clash with fashion trends. The constant shift in trends, styles, and preferences introduces further difficulties and issues into conventional systems attempting to provide users with personalized fashion recommendations.

Because semantic data with fashion items can be sparse and unreliable, some conventional systems have attempted to provide users with fashion recommendations based on preferences of similar users. For example, these conventional systems group a user with co-users and provides common fashion item recommendations based on shared characteristics of the group rather than the user's personal preference. However, these conventional systems do not provide recommendations personalized for the individual user. Indeed, unlike other products, fashion preferences, tastes, and styles are highly specialized and unique to users.

In addition to struggling to provide personalized fashion recommendations, conventional systems are limited to recommended fashion items in a listing or catalog of fashion items. Indeed, even the best conventional systems can only recommend which existing fashion item a user might prefer. However, conventional systems cannot automatically design and create new fashion items or even modify existing fashion items to uniquely match a user's fashion tastes and preferences. Such a complex and sophisticated system that creates fashion items based on visually-aware cues from a user does not yet exist.

Overall, when trying to recommend fashion items, conventional systems often waste computing resources by inefficiently attempting to gather and analyze data in an attempt to provide users with personalized recommendations. As a result, conventional systems fail to efficiently analyze and provide accurate personalized fashion recommendation results to users. Furthermore, the inflexibility of these systems prevents them from creating new fashion items or modifying existing fashion items to better suit the tastes and preferences of individual users.

These and other problems exist with regard to analyzing, providing, designing, creating, and modifying personalized fashion items for users using existing systems and methods.

SUMMARY

Embodiments of the present disclosure provide benefits and/or solve one or more of the foregoing or other problems in the art with systems, computer media, and methods for effectively synthesizing user-customized images using deep learning techniques based on visually-aware user data. In particular, the disclosed systems train an image generative adversarial (neural) network (or simply "GAN") to synthesize images of fashion items. In addition, the disclosed systems pair the GAN with a user-trained personalized preference network to design and create fashion items specific to the user as well as modify existing fashion items to better match a user's taste and preferences.

More particularly, the disclosed systems employ a corpus of fashion images to train a GAN that generates realistic images of fashion items. In addition, the disclosed systems employ the trained GAN and a personalized preference network to generate user-customized fashion images. For instance, the disclosed systems determine latent code for the GAN that maximizes the user's visually-aware latent features with respect to the personalized preference network. Often, the process of determining the latent code is iterative and/or category-specific. Using the determined latent code (i.e., latent code input), the GAN synthesizes a realistic image of a new fashion item that is personalized to the user. Indeed, the synthesized image can be, and largely is, a new fashion item not included in any existing fashion catalog.

Moreover, the disclosed systems employ the trained GAN and the personalized preference network to tailor existing fashion items to a user's preferences. For instance, based on obtaining an existing fashion item, the disclosed systems identify latent code for the GAN that generates an image that approximates the obtained image. Using the identified latent code as a starting point within the learned random latent space, the disclosed systems can employ the combined GAN and personalized preference network to synthesize a modified version of the original fashion item that is customized to the user's preferences.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
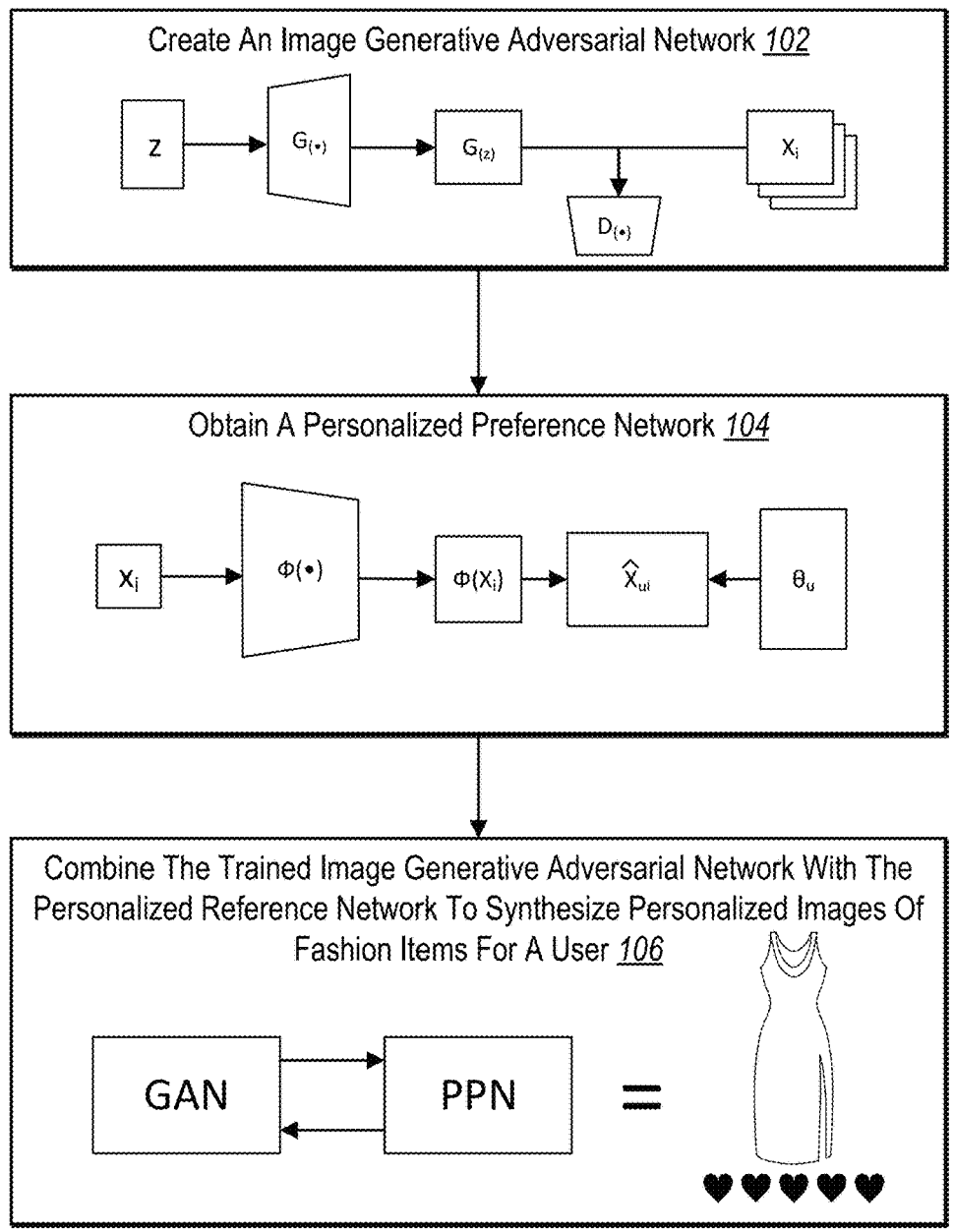
FIG. 1 illustrates an overview diagram of employing a visually-aware personalized image generation network in accordance with one or more embodiments.

This disclosure describes one or more embodiments of a personalized fashion generation system that synthesizes user-customized images using deep learning techniques based on visually-aware user preferences. In particular, the personalized fashion generation system combines an image generative adversarial neural network (or "GAN") and a personalized preference network to synthesize user-customized fashion items for a user. The personalized fashion generation system can personalize the GAN and/or the personalized preference network to a given user such that the personalized fashion generation system designs and synthesizes realistic images of fashion items that are uniquely tailored for the user.

To illustrate, the personalized fashion generation system can generate the GAN using images from a corpus of fashion images. In one or more embodiments, the GAN includes a generator neural network (or simply generator) that the personalized fashion generation system trains using latent code mixed with random noise to learn visual latent representations of fashion characteristics of the fashion items in the corpus. To assist in training the generator, the GAN also includes a discriminator neural network (or simply discriminator) that competes with the generator during training. For instance, the personalized fashion generation system trains the discriminator to determine whether an input image is from a corpus of fashion images (e.g., a real image) or from the generator (e.g., a synthesized image or "fake" image).

Because the generator and discriminator compete with each other during training, the personalized fashion generation system alternately optimizes the generator and the discriminator during training using back propagation in an unsupervised manner. Once the GAN is trained, the generator creates synthesized images that largely fool the discriminator into classifying the synthesized images as real images. Indeed, the discriminator has difficulties detecting a synthesized image as a fake image because the trained generator synthesizes images of fashion items that are similar in appearance and distribution to the corpus of fashion images.

In additional embodiments, the personalized fashion generation system also generates the personalized preference network based on implicit user data that determines personalized fashion recommendations for a user. In one or more embodiments, the personalized preference network is a combination of a Siamese convolutional neural network that determines latent item features for a user using user-based triplets and a personalized ranking model that determines latent user features for the user, which the personalized fashion generation system jointly trains to produce the personalized preference network, which outputs preference prediction scores per user for each inputted item. Alternatively, the personalized fashion generation system employs a pre-trained personalized preference network.

As mentioned above, the personalized fashion generation system can employ a GAN and a personalized preference network to synthesize fashion items customized for a user. For example, the personalized fashion generation system iteratively employs the trained GAN and the personalized preference network to search through random latent space to identify low-dimensional latent code with learned GAN space that maximizes the user's visual latent features with respect to the personalized preference network. Indeed, the personalized fashion generation system identifies latent code that, when input into the generator, synthesizes fashion images of new fashion items that are both realistic (e.g., classified as real by the discriminator) and that produce favorable preference prediction scores for the user by the personalized preference network.

In one or more embodiments, the personalized fashion generation system can further optimize the latent code (e.g., a latent code vector) identified for a user. For instance, the personalized fashion generation system searches adjacent locations within the random latent space of the GAN to discover if any adjacent latent code yields a higher preference prediction score for the user. For example, the personalized fashion generation system confines the parameter space and employs stochastic gradient to iteratively search for latent code that better matches a user's preferences. In additional embodiments, the personalized fashion generation system also selects an additional number of random initial positions within the GAN space to determine if less-adjacent latent code better matches a user's preferences.

In various embodiments, the personalized fashion generation system synthesizes fashion images for a user specific to a particular fashion category. For instance, the personalized fashion generation system creates a new GAN and/or personalized preference network for each fashion category and user. Alternatively, the personalized fashion generation system employs the same GAN but learns a separate or isolated latent code for each category (e.g., learns locations in the random latent space of the GAN that corresponds to each fashion category).

In some instances, the personalized fashion generation system can receive a request for a given category and user. In response, the personalized fashion generation system can return one or more synthesized images of fashion items from the given category designed based on the user's tastes and preferences. In some embodiments, the personalized fashion generation system performs sampling when returning multiple user-customized synthesized images to ensure diversity among the provided results, which prevents the results from all looking the same.

In addition to synthesizing new designs and fashions personalized for a user, the personalized fashion generation system can also modify existing fashion items to better match a user's tastes and preferences. For instance, the personalized fashion generation system uses the trained GAN and the personalized preference network to modify existing fashion items to better align with a user's preferences.

More particularly, the personalized fashion generation system obtains an image of a fashion item. Upon obtaining the image (i.e., query image) of the fashion item, the personalized fashion generation system searches for latent code in random latent space of the GAN that best approximates the image. For example, the personalized fashion generation system identifies latent code that results in a synthesized image that most closely appears like the query image. Then, using the identified latent code as an initial point in the GAN space, the personalized fashion generation system employs the optimization process mentioned above identify adjacent latent code that better matches a user's preferences.

Once latent code optimized to the user's preferences is identified, the personalized fashion generation system feeds the optimized latent code used as input into the generator of the trained GAN to create a modified version of fashion item shown in the query image. Indeed, by employing latent user features in connection with the trained GAN and the personalized preference network, the personalized fashion generation system can modify an existing fashion item to design a tailored version of the item for the user. Visual examples of both newly synthesized and modified images of fashion items are provided in the figures described below.

As previously mentioned, the personalized fashion generation system provides many advantages and benefits over conventional systems and methods. As mentioned above, conventional systems cannot automatically generate synthesized fashion images based on latent user visual preferences. Rather, conventional systems are constrained to recommending fashion items to a user from existing listings. These existing fashion items are not personalized to a user based on the user's tastes and preferences. In contrast, the personalized fashion generation system employs novel techniques, processes, and methods to automatically design new and modify existing fashion items that uniquely suit a user, without requiring user input or intervention during the process.

In addition, the personalized fashion generation system can flexibly train the neural networks and models from a variety of datasets. For example, the personalized fashion generation system can employ datasets that include implicit or explicit user feedback. Likewise, the personalized fashion generation system can train with an image item dataset from one domain and provide recommendations from an image item dataset from a second domain. Indeed, because the personalized fashion generation system employs visually-aware images in training, the personalized fashion generation system provides increased flexibility over conventional systems by training across domains and subdomains.

Similarly, the personalized fashion generation system can train and provide personalized recommendations when little or no semantic information is provided in connection with items. As detailed previously, conventional systems rely heavily on semantic data to classify and organize fashion items. Because of the complexity, diversity, and non-uniformity of semantic information, conventional systems struggle to provide personalized recommendations, particularly with respect to new or unique/rare fashion items (e.g., cold starts). In contrast, the personalized fashion generation system employs visual-based information (e.g., images of items) in connection discover fashion properties and hidden (e.g., latent) preferences of fashion items for individual users. In this manner, the personalized fashion generation system can synthesize both new and modified images that better match a user's personal tastes and preferences.

Additional advantages and benefits of the personalized fashion generation system will become apparent in view of the following description. In particular, one or more embodiments of the personalized fashion generation system will be described below with reference to one or more figures. Further, the following definitions of terms will be used to describe one or more features of the personalized fashion generation system.

As used herein, the term "item" refers generally to a compilation of digital data that can be stored on a computing device. In particular, the term "item" refers to a compilation of digital data stored in one or more file types or formats. In general, an item refers to a fashion item, such as clothing, articles, or accessories in the fashion domain. However, an item can correspond to items in alternative domains. In addition, items can be stored in a corpus, datasets, or databases of items. In some embodiments, an item also includes data or metadata describing or categorizing an item (e.g., women's shoes, red shirt, or hat).

As used herein, the term "image" refers to any type of digital graphics file that includes an object and/or element. In particular, the term "image" refers to a digital file that visually depicts an item. Images are often associated with items, such as fashion items. For instance, each item in a dataset includes at least one image of the item in the dataset. In these instances, the term "image item" refers to an item that is represented by an image of the item. In addition, images can be real or synthetic (i.e., synthesized). For example, the personalized fashion generation system can generate synthesized images of fashion items, as described below.

The term "machine learning," as used herein, refers to the process of constructing and implementing algorithms that can learn from and make predictions on data. In general, machine learning may operate by building models from example inputs (e.g., training), such as latent code, to make data-driven predictions or decisions. In some example embodiments, machine learning is used for data mining, and statistical pattern recognition, such as collaborative feature learning, or learning features from a training image-based item set. Machine learning can include neural networks (e.g., a generative adversarial network), data-based models, or a combination of networks and models (e.g., a personalized preference network).

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional or deconvolutional neural networks. In addition, a neural network is an algorithm (or set of algorithms) that implements deep learning techniques that utilize a set of algorithms to model high-level abstractions in data. In one or more embodiments, a neural network refers to a neural network having a regression loss model in the loss layer.

The term "generative adversarial network" (or simply "GAN") refers to a neural network that includes a generator neural network (or simply "generator") and a competing discriminator neural network (or simply "discriminator"). More particularly, the generator learns how, using random noise combined with latent code vectors in low-dimensional random latent space, to generate synthesized images that have a similar appearance and distribution to a corpus of training images. The discriminator in the GAN competes with the generator to detect synthesized images. Specifically, the discriminator trains using real training images to learn latent features that represent real images, which teaches the discriminator how to distinguish synthesized images from real images. Overall, the generator trains to synthesize realistic images that fool the discriminator, and the discriminator tries to detect when an input image is synthesized (as opposed to a real image from the training images). Additional detail regarding iteratively training a GAN is provided below.

As used herein, the terms "loss function" or "loss model" refer to a function that indicates loss errors. As mentioned above, in some embodiments, a machine-learning algorithm can repetitively train to minimize overall loss. In some embodiments, the personalized fashion generation system employs multiple loss functions and minimizes overall loss between multiple networks and models. Examples of loss functions includes a softmax classifier function (with cross-entropy loss), a hinge loss function, and a least squares loss function.

As used herein, the term "joint learning" refers to a machine-learning algorithm where multiple learning models are learned together. In particular, the term "joint learning" includes solving a plurality of learning tasks at the same time while utilizing the roles and constraints across the tasks. For example, the personalized fashion generation system can employ joint learning to simultaneously (including alternately) train and tune the parameters of both the generator neural network and the discriminator ranking model within the image generative adversarial network.

As used herein, the term "latent code" refers to a vector of numeric values representing visual latent features of items. In particular, the term "latent code" includes a set of values corresponding to latent and/or hidden preferences of images. In one or more embodiments, latent code refers to a low-dimensional latent code vector that is used as input to the generator of the image generative adversarial network and is used to generate a synthesized image. During training latent code can be combined with and include random noise, as described below. In addition, in some embodiments, latent code refers to a location within the random latent spaced learned by the generator of the image generative adversarial network.

As used herein, the term "latent user features" refers to a vector of numeric values representing preferences, characteristics, and attributes of a user. In particular, the term "latent user features" includes a set of values corresponding to latent and/or hidden preferences of a user. In one or more embodiments, latent user features are represented by a feature vector in multi-dimensional vector space (e.g., three-dimensional). Similarly, the term "latent item features" refers to a vector of numeric values representing visual characteristics and attributes of an item. In particular, the term "latent item features" includes a set of values corresponding to latent and/or hidden characteristics identified based on observed user action (e.g., implicit or explicit feedback). In one or more embodiments, latent item features are represented by a feature vector in multi-dimensional vector space.

As used herein, the term "personalized preference network" refers to a model that identifies a user's preference for an item with respect to other items. For example, the personalized preference network determines a preference predictor score that indicates how favorable an image (real or synthetic) is to a user. Often, a personalized preference network determines preference predictions by correlating feature vectors between multiple networks and models to identify a user's preference. In one or more embodiments, as described below, the personalized fashion generation system employs a personalized preference network that maximizes correlations between the latent item features and the latent user features to determine favorable preference prediction scores (e.g., correlation scores) for items for a user, as detailed below. In alternative embodiments, the personalized fashion generation system employs another type of personalized preference network that ranks items based on a user's affinity for each of the items.

Referring now to the figures, the figures describe the personalized fashion generation system with respect to articles of clothing and other accessories. One will appreciate that the techniques, operations, methods, and actions described with respect to the personalized fashion generation system and the figures apply to other types of image-based recommendation systems. For instance, the actions techniques, operations, methods, and actions described herein can also relate to generating user-customized images of other types of items besides fashion items.

FIG. 1 shows a diagram of a general process 100 for employing a visually-aware personalized image generation network in accordance with one or more embodiments. For instance, in one or more embodiments, a personalized fashion generation system implements the general process 100 to train and employ a visually-aware personalized image generation network. The personalized fashion generation system can be located in one or more computing devices, such as one or more server devices, one or more client devices, or a combination of server devices and client devices.

As shown in FIG. 1, the personalized fashion generation system creates 102 an image generative adversarial network (or GAN). As mentioned above, and further detailed below, the GAN includes both a generator and a discriminator, which the personalized fashion generation system jointly trains to generate synthesized images of new fashion items not included in current fashion catalogs or listings. Further, the personalized fashion generation system trains the GAN to generate realistic images that appear similar to and have a distribution similar to a set of training images.

To illustrate, in various embodiments, the personalized fashion generation system feeds latent code mixed with random noise (e.g., a random noise latent code vector) as input into the generator to create synthesized images. The personalized fashion generation system feeds the synthesized images to a discriminator, which determines whether the synthesized images appear realistic. The personalized fashion generation system jointly trains the generator and the discriminator until the generator can consistently fool a well-trained discriminator. Additional description regarding training a GAN is provided below with respect to FIGS. 2A-2B.

In addition to training the GAN the personalized fashion generation system obtains 104 a personalized preference network. A personalized preference network is a user-specific network that ranks images based on user preferences. For instance, the personalized fashion generation system feeds images into a personalized preference network, which determines preference prediction scores for each of the images with respect to a user's preferences. A personalized preference network can learn a user's preferences based on implicit and/or explicit feedback. In one or more embodiments, the personalized fashion generation system generates and trains a personalized preference network, as further described with respect to FIGS. 3A-3B. In alternative embodiments, the personalized fashion generation system employs a pre-trained personalized preference network.

Further, the personalized fashion generation system combines 106 the trained GAN with the personalized preference network to synthesize personalized images of fashion items for a user. For instance, the personalized fashion generation system feeds a realistic synthesized image produced by the GAN into the personalized preference network to determine a preference prediction score for the synthesized image. The personalized fashion generation system then iteratively modifies the latent code input into the GAN to find updated latent code that yields higher preference prediction scores (e.g., better correlates to the latent user features identified by the personalized preference network). Using the updated latent as input, the personalized fashion generation system can generate and present a synthesized image that is based on the user's preferences.

As mentioned above, the personalized fashion generation system can both generate new images of fashion items as well as modify existing fashion item images. For example, the personalized fashion generation system receives a request to provide the user with new fashion items for a given fashion category not listed in a fashion catalog. In response, the personalized fashion generation system employs the trained GAN and personalized preference network to design one or more synthesized images personalized to the user. Additional detail regarding synthesizing new items is provided with respect to FIGS. 4A-4C.

In another example, the personalized fashion generation system receives a request to modify existing fashion item. In response, the personalized fashion generation system approximates the received image within the GAN. Then the personalized fashion generation system employs the trained GAN and personalized preference network to design one or more modified versions of the fashion item that is customized to the user's preferences and tastes. Additional detail regarding modifying existing items is provided in connection with FIGS. 5A-5C.

Figure 2A:
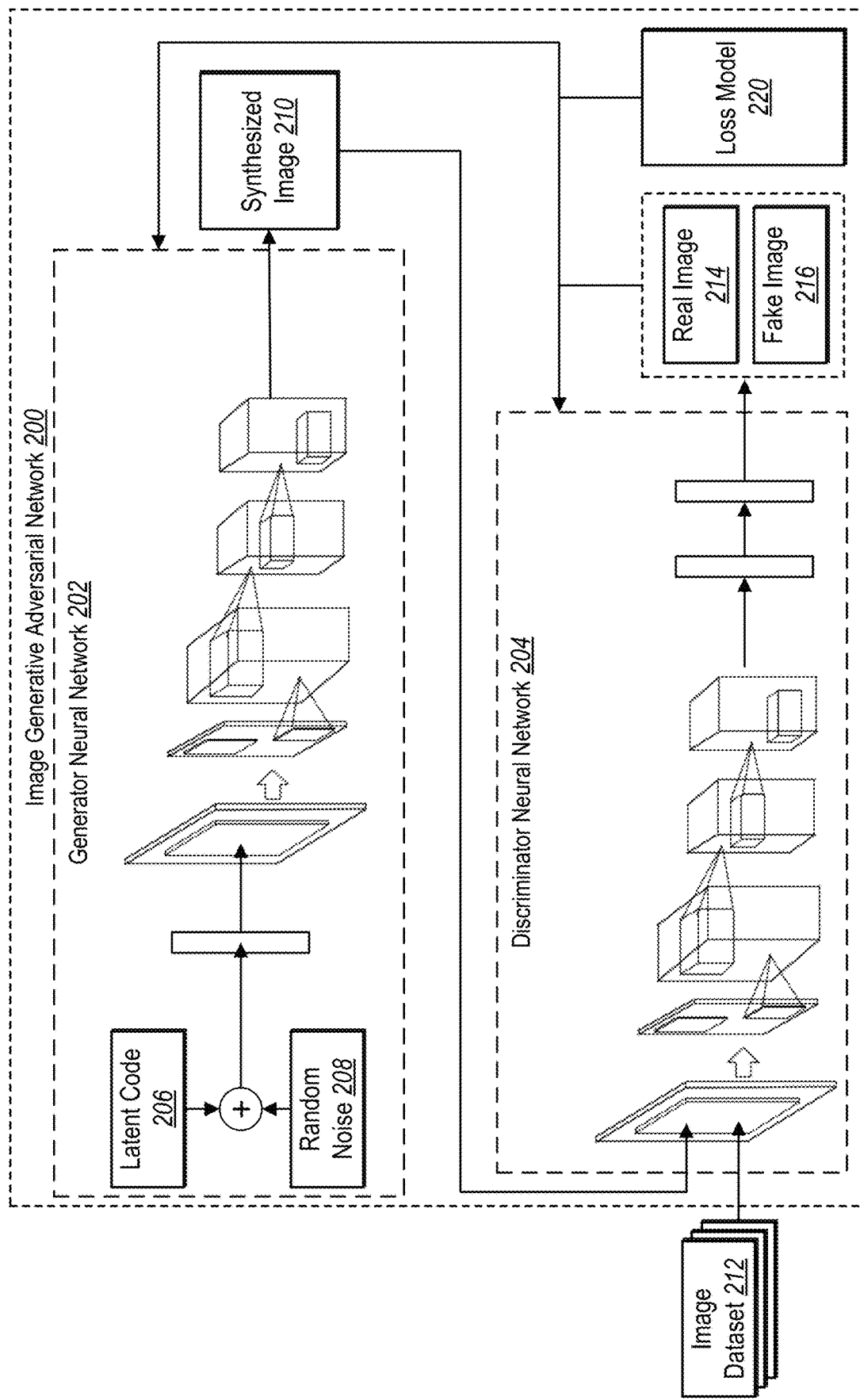
FIGS. 2A-2B illustrate diagrams of training an image generative adversarial neural network (or GAN) to synthesize realistic images of fashion items in accordance with one or more embodiments.

As mentioned above, FIGS. 2A-2B illustrates a diagram of a more detailed process for training an image generative adversarial neural network 200 (or "GAN 200") to synthesize realistic images of fashion items. In particular, FIG. 2A shows a generator neural network 202 (or "generator 202") and a discriminator neural network 204 (or "discriminator 204"). The generator 202 and discriminator 204 can each comprise one or more types of neural networks, such as a multi-layer convolutional neural network (or "CNN"), a multi-layer deconvolutional neural network (or "DNN"), or other types of neural network. For instance, in one or more embodiments, the generator 202 is a DNN while the discriminator 204 is a CNN.

In general, and as mentioned above, the generator 202 takes a random noise vector as input and synthesizes an image. The discriminator 204 takes the synthesized image and predicts the likelihood of the image being 'real.' The personalized fashion generation system trains the GAN 200 using a loss function to improve image quality and realness of images synthesized by the generator 202 as well as to improve detection of non-realistic images by the discriminator 204.

More specifically, as shown in FIG. 2A, the personalized fashion generation system trains the generator 202 by providing latent code 206 combined with random noise 208 (e.g., a random noise latent code vector) to the generator 202. In additional embodiments, the personalized fashion generation system also inputs a category (e.g., fashion category) as an input to the generator 202. In response, the generator 202 processes the input(s) and generates a sample image (i.e., synthesized image 210).

The personalized fashion generation system feeds the synthesized image 210 into the discriminator 204 as input. In addition, the discriminator 204 receives images from an image dataset 212 that includes real images as input. Using the image dataset 212, the discriminator 204 learns latent visual features that semantically describe fashion characteristics. When the discriminator 204 receives the synthesized image 210 as input, the discriminator 204 compares the latent visual features of the synthesized image 210 to those learned from the image dataset 212. Based on the comparison, the discriminator 204 classifies the synthesized image 210 as a real image 214 or a fake image 216.

As shown, the GAN 200 also includes a loss model 220. The personalized fashion generation system employs the loss model 220 to further train both the generator 202 and the discriminator 204. As described below, the loss model 220 can provide feedback to the generator 202 and the discriminator 204 in an alternating manner until the total loss is minimized and/or the GAN is sufficiently trained. In one or more embodiments, the loss model 220 employs least squares loss. In alternative embodiments, other loss functions are employed (e.g., softmax classifier loss or hinge loss).

More particularly, in various embodiments, the loss model 220 determines an amount of error loss between the classification of the discriminator 204 (i.e., a real image 214 or a fake image 216) versus the input to the discriminator 204. For instance, if the discriminator 204 correctly classifies the synthesized image 210 as a fake image 216, the loss model 220 provides feedback to the generator 202 indicating that the synthesized image 210 did not fool the discriminator 204 (e.g., the error loss in the feedback indicates how different the latent visual features of the synthesized image 210 is from that of real images). In response, the generator 202 uses the error loss to tune weights and parameters (e.g., learn) such that the generator 202 generates realistic synthesized images. Otherwise, the feedback provided to the generator 202 indicates that the generator 202 successfully fooled the discriminator 204.

Similarly, if the discriminator 204 incorrectly classifies the synthesized image 210 as a real image 214, (or a real image from the image dataset 212 as fake), the loss model 220 provides feedback to the discriminator 204 indicating that the discriminator 204 falsely classified the input image. In response, the discriminator 204 uses the feedback to tune its weights and parameters to better detect and classify synthesized images as fake. Otherwise, the provided feedback to the discriminator 204 indicates that the discriminator 204 successfully classified the input image.

As mentioned above, because the generator 202 and the discriminator 204 compete against each other, the personalized fashion generation system can provide alternating feedback from the loss model 220 to the two neural networks. In this manner, as the generator 202 improves and generates more realistic synthesized images, the discriminator 204 also improves in detecting synthesized images. The personalized fashion generation system can jointly train the generator 202 and the discriminator 204 until one or both of the neural networks converges. In particular, the personalized fashion generation system can simultaneously train the generator 202 and the discriminator 204 to jointly minimize their respective objective functions (e.g., minimize error loss), as further described in FIG. 6 below.

Once trained, the GAN 200 generates synthesized images that appear realistic enough and largely fool a well-trained discriminator 204. In addition, the personalized fashion generation system trains the GAN 200 to generate synthesized images that follow the same distribution as the image dataset 212. In this manner, the discriminator cannot distinguish the synthesized images from those in the image dataset 212 (e.g., in both quality and diversity).

Figure 2B:
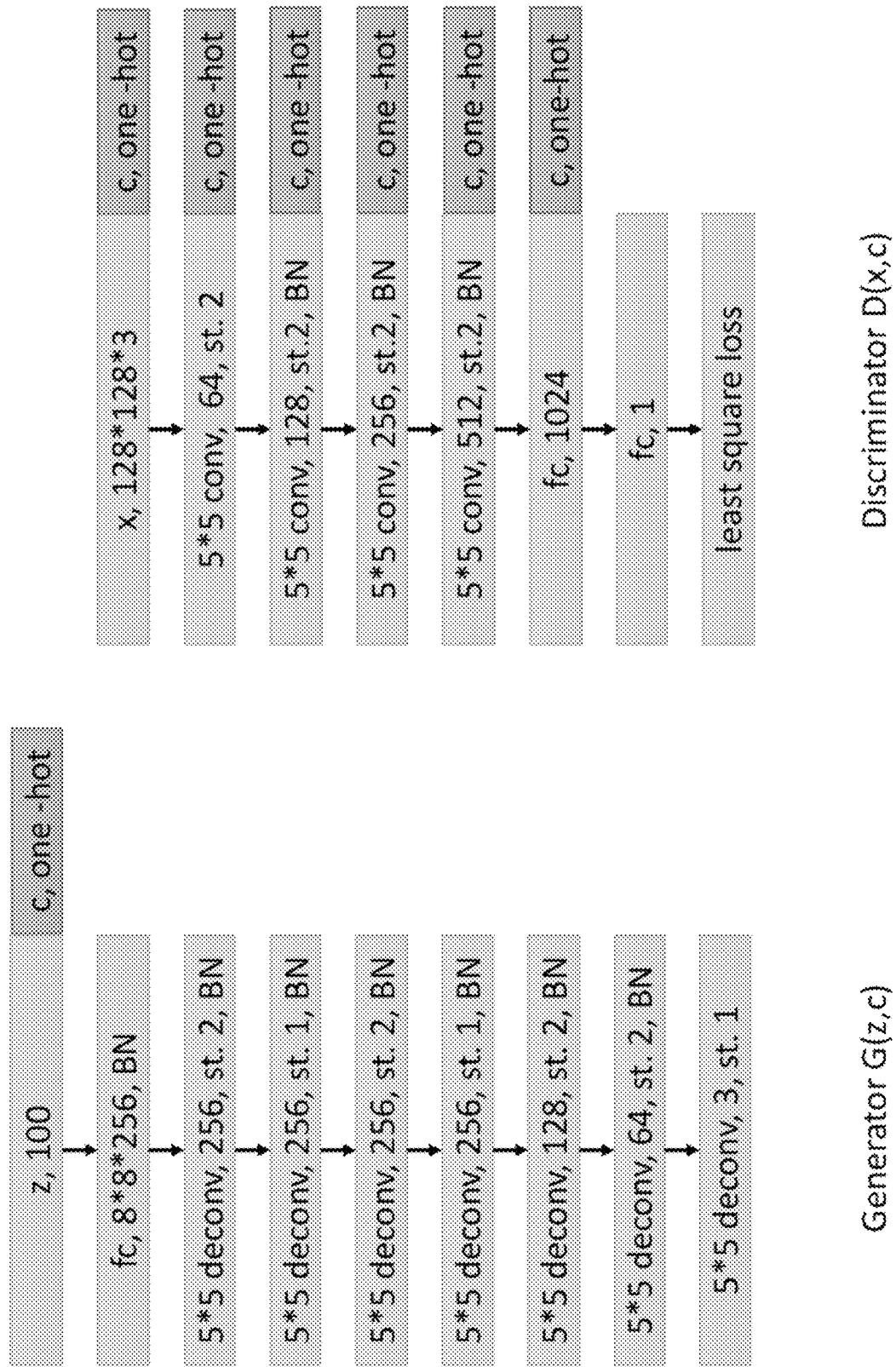

FIG. 2B illustrates a detailed architecture of one embodiment of a GAN. In particular, FIG. 2B shows a Generator G and a Discriminator D. The Generator G receives as input, a random latent vector of latent code and noise (i.e., "z") and a category classification (i.e., "c"). In addition, the Generator G includes a fully-connected layer (i.e., "fc") and seven deconvolutional layers (i.e., "deconv"). Each of the layers are multi-dimensional. Further, each layer has a stride (i.e., "st.") of 1 or 2 as well as employs batch normalization ("i.e., "BN").

As shown, the personalized fashion generation system inputs the random latent vector (i.e., "z") into the Generator G. In addition, the personalized fashion generation system inputs the number "100" indicating the amount of random numbers used to produce a synthesized image. Further, the personalized fashion generation system employs the input category and a one-hot encoding algorithm (i.e., "one-hot") in connection with the inputs. Based on the input of the random latent vector and category, the Generator G produces a synthesized image.

The personalized fashion generation system feeds the synthesized image into the Discriminator D. In particular, the Discriminator D receives the synthesized image (i.e., "x") and a category. As shown, the Discriminator includes four convolutional layers (i.e., "cony") and two fully-connected layers, where all but the last fully-connected layer are multi-dimensional layers that employ the one-hot encoding algorithm and batch normalization. Further, the Discriminator D includes a loss layer that performs least square loss. As described above, the Discriminator D outputs a classification of the synthesized image as real or fake (e.g., 0 or 1), and the personalized fashion generation system employs the error loss to further train and tune both the Generator G and the Discriminator D.

While not shown in FIG. 2B, the personalized fashion generation system may perform upscaling or downscaling to the synthesized image before, during, or after the discriminator D classifies the synthesized image as real or fake. For example, in one or more embodiments, the personalized fashion generation system upscales the synthesized image before feeding the synthesized image into the Discriminator D. In some embodiments, the personalized fashion generation system upscales the synthesized image upon the Discriminator D classifying the synthesized image as real.

In addition, while FIG. 2 illustrates architecture of one embodiment of a GAN, other architectures and variations are possible. For example, another architecture may employ a different number of convolutional layers, deconvolutional layers, fully-connected layers. In another example, one architecture may employ different dimensions within one or more of the network layers.

Figure 3A:
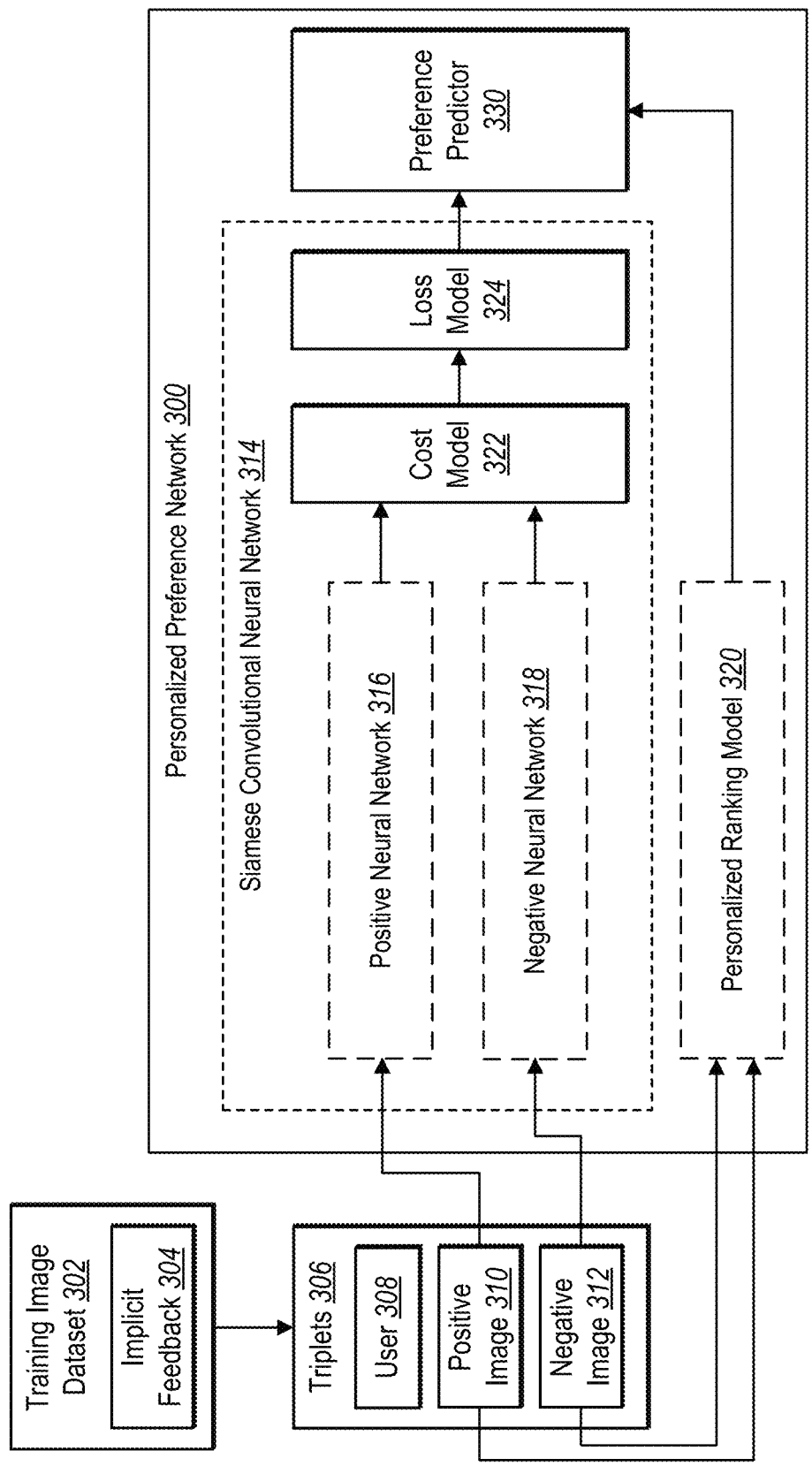
FIGS. 3A-3B illustrate diagrams of generating and employing a personalized preference network using implicit user feedback in accordance with one or more embodiments.

As mentioned above, FIGS. 3A-3B illustrate diagrams of generating and employing a personalized preference network using implicit user feedback in accordance with one or more embodiments. As shown in FIG. 3A, the personalized preference network 300 includes a Siamese convolutional neural network 314 having a positive neural network 316, a negative neural network 318, a cost model 322, and a loss model 324. The personalized preference network also includes a personalized ranking model 320. Additionally, the personalized preference network 300 includes a preference predictor 330. A detailed description of the personalized preference network 300 and other personalized preference networks are described in "GENERATING VISUALLY-AWARE ITEM RECOMMENDATIONS USING A PERSONALIZED PREFERENCE RANKING NETWORK," U.S. patent application Ser. No. 15/897,822, which is herein incorporated by reference in its entirety.

As used herein, the term "Siamese convolutional neural network" refers to a matching or parallel set of convolutional neural networks with one or more shared parameters. In particular, the term "Siamese convolutional neural network" refers to two convolutional neural networks that share tunable weights and parameters. For instance, the Siamese convolutional neural network 314 includes the positive (convolutional) neural network 316 and a matching negative (convolutional) neural network 318, where both networks equally process their respective inputs (e.g., a positive image item and a negative image item). Further, in the illustrated embodiment, the Siamese convolutional neural network 314 shares the same cost model 322 that compares the output of the networks (e.g., measured scaler loss based on the distance between a positive output and negative output in vector space) to determine desired latent features.

The term "personalized ranking model" refers to a machine-learning algorithm that is trained to analyze data and produce a resulting latent representation or embedding. In some embodiments, the personalized ranking model 320 includes a Bayesian personalization ranking algorithm that employs a loss method to determine latent feature vectors as the personalized ranking model. In additional embodiments, the personalized fashion generation system also employs matrix factorization (MF) as an underlying predictor and/or stochastic gradient (e.g., ascent or descent) to determine feature vectors for a user. Generally, the personalized ranking model 320 determines latent user features, as described below.

In one or more embodiments, the personalized fashion generation system trains the personalized preference network 300 using triplets 306. The term "triplet," as used herein refers to a given user's relationship to a set of items (e.g., fashion items). A triplet includes a user 308, a positive item represented by a positive image 310, and a negative item represented by a negative image 312. In particular, the term "triplet" refers to a user preferring the positive item in the triplet at least the same amount or a greater amount than the negative item in the triplet. Indeed, the positive item is largely ranked or scored higher (but not below) than the negative item in a triplet. In many embodiments, the positive item is associated with items for which the user has provided feedback (e.g., implicit or explicit), while the negative has no such associated information. In various embodiments, the personalized fashion generation system generates and employs the triplets 306 to train the Siamese convolutional neural network 314 and the personalized ranking model 320 within the personalized preference network 300.

As shown, the personalized fashion generation system employs the training image dataset 302 to generate triplets 306. In one or more embodiments, a positive item corresponds to an item in the training image dataset 302 with which the user has interacted. In many embodiments, the personalized fashion generation system limits user interactions to implicit feedback 304 when determining positive items for a user. In alternative embodiments, the personalized fashion generation system includes all types of user interactions (e.g., both implicit and explicit feedback). Additionally, a negative item corresponds to an item in the training image dataset 302 with which no interaction data is available for a user (e.g., an item has no implicit and/or explicit feedback associated with a user).

Upon generating the triplets 306, the personalized fashion generation system feeds the triplets 306 into the Siamese convolutional neural network 314. In particular, the personalized fashion generation system feeds the positive image 310 to the positive neural network 316 and the negative image 312 to the negative neural network 318. Each of the neural networks determine latent item features for the respective images.

As shown in FIG. 3A, the personalized fashion generation system then feeds the outputs of the positive neural network 316 (i.e., a positive latent item feature) and the negative neural network 318 (i.e., a negative latent item feature) into the cost model 322. The cost model 322 generates the distance, in vector space, between the positive latent item feature and the negative latent item feature. The comparison or difference between latent item features of the positive image 310 and the negative image 312 in the triplet is used to teach the Siamese convolutional neural network 314 the user's visual latent preferences of items (i.e., latent item features).

The personalized fashion generation system then feeds the output of the cost model 322 (e.g., a latent item feature) to the loss model 324. In one or more embodiments, the loss model 324 is a latent item loss model, which determines an amount of loss for the positive neural network and the negative neural network of the Siamese convolutional neural network 314. For instance, in one or more embodiments, the loss model 324 combines the latent item feature with the positive image label to determine a positive scaler loss for the positive neural network 316 and negative scaler loss for the negative neural network 318, which can be used to further train the shared weights and parameters of the neural networks.

Turning now to the personalized ranking model 320, the personalized fashion generation system can also use the triplets 306 for the user 308 to train the personalized ranking model 320. For example, in one or more embodiments, the personalized ranking model 320 applies a Bayesian personalized ranking loss algorithm to the positive image 310 and negative image 312 in the triplet to optimize the ranking of visual user preferences based on the relative comparison of the positive image 310 having a larger preference score for the user than the negative image 312. The personalized ranking model 320 outputs latent user features that represent the visual user preferences. In additional embodiments, the personalized ranking model 320 also employs matrix factorization as an underlying predictor to determine latent user features.

In addition, as part of training the personalized preference network 300, the personalized fashion generation system can feed the output of the Siamese convolutional neural network 314 (i.e., latent item features) to the preference predictor 330. Similarly, the personalized fashion generation system can feed the output of the personalized ranking model 320 (i.e., latent user features) to the preference predictor 330. In general, the preference predictor 330 correlates the two sets of latent features to determine an improved personalized recommendation ranking of items for the user. Further, using the latent features determined for each user, the preference predictor 330 determines a preference prediction score for the user for each item input to the personal preference network 300.

In various embodiments, the personalized fashion generation system employs the preference predictor 330 to jointly train the Siamese convolutional neural network 314 and the personalized ranking model 320 to maximize correlations between the respective latent features. For instance, the preference predictor 330 provides feedback in the form of back propagation to both the Siamese convolutional neural network 314 and the personalized ranking model 320.

To illustrate, in one or more embodiments, the preference predictor 330 determines a loss amount, based on triplet information, from correlating the latent item features and the latent user features (e.g., using least squares loss or another loss function). In a similar manner as described above, the personalized fashion generation system employs end-to-end learning and joint back propagation to teach both the Siamese convolutional neural network 314 and the personalized ranking model 320 to extract task-guided latent visual features for fashion images particular to a user's fashion preferences. As used herein, the term "end-to-end learning" refers to mapping outputs of a network or model to the inputs. In many embodiments, end-to-end learning is task-guided to extract visual features from images.

As a note, in many embodiments, the personalized fashion generation system trains a separate personalized preference network 300 for users separately as well as by category. Indeed, in these embodiments, the trained personalized preference network 300 is unique to the user and not a collective group of users. Thus, the personalized fashion generation system can provide a personalized ranking of items to a user that are optimized and customized specifically for that user. Further, based on the type or recency of implicit data used from the training image dataset, the personalized fashion generation system can further tailor the trained personalized preference network 300 to a user's most recent set of fashion preferences as the user's preferences or fashion trends change over time.

Figure 3B:
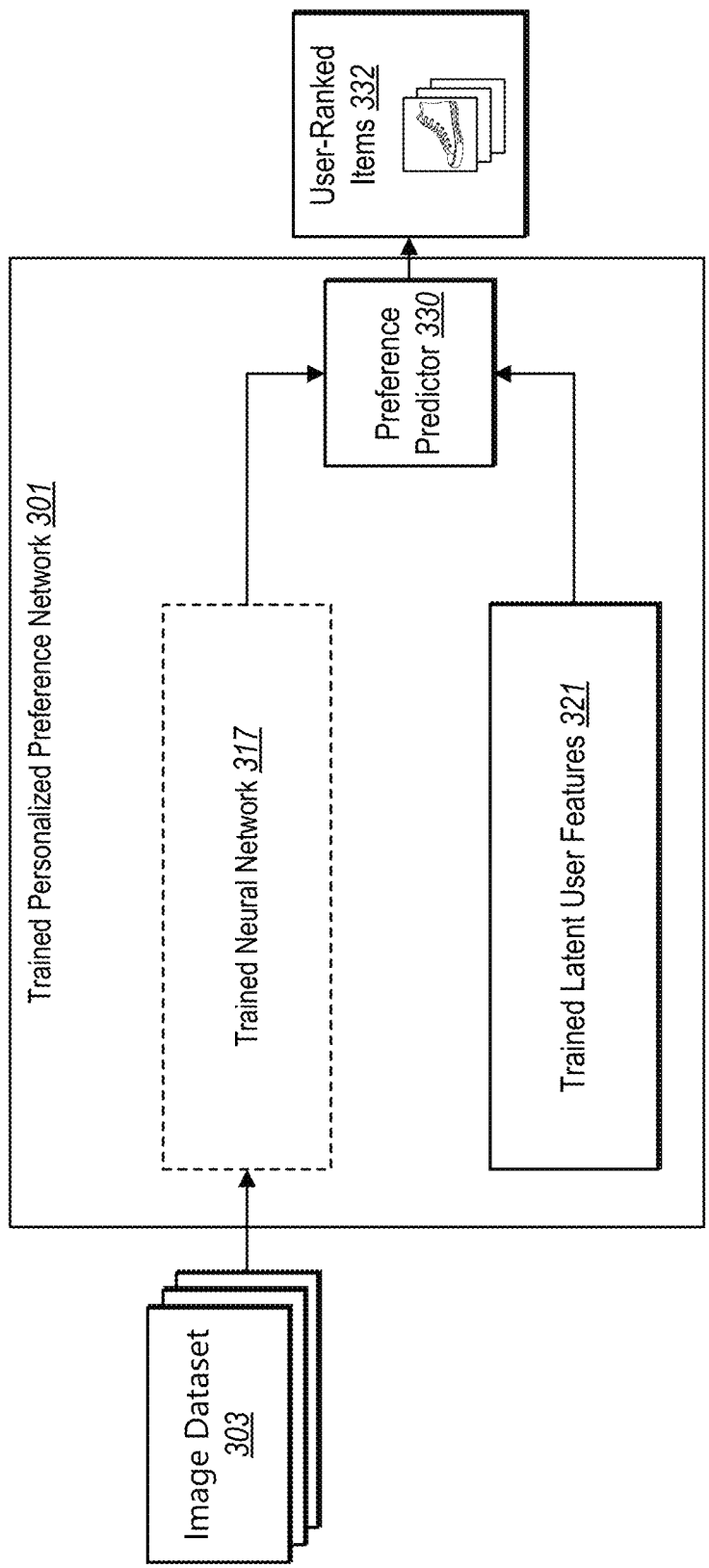

FIG. 3B shows a diagram of employing a trained personalized preference network 301 to score or rank fashion items for a user in accordance with one or more embodiments. As shown, the trained personalized preference network 301 includes a trained neural network 317, trained latent user features 321, and the preference predictor 330. In one or more embodiments, the trained neural network 317 employs the shared weights and parameters from the Siamese convolutional neural network 314. In other words, once trained, the Siamese convolutional neural network 314 need only employ one of the two convolutional neural networks (e.g., the positive neural network 316 or the negative neural network 318), since both networks have the same weights and parameters that were optimized through the joint training described above.

Similarly, once the personalized ranking model 320 (FIG. 3A) has learned an optimal set of latent item features for the user, the personalized fashion generation system can employ the set of trained latent user features 321 in determining personalized item rankings for the user. In addition, the personalized fashion generation system can update and re-train either the Siamese convolutional neural network 314 and/or personalized ranking model 320 (e.g., periodically or upon request) to learn updated representations for the user (e.g., latent user features are updated monthly).

As mentioned, the trained personalized preference network 301 includes the preference predictor 330. As described above, the preference predictor 330 correlates latent item features for images input into the trained neural network 317 with the trained latent user features 321 to determine user-specific preference prediction scores for items, which are then used to rank items according to user preference.

To illustrate, the personalized fashion generation system obtains an image dataset 303. As described below, in various embodiments, the image dataset 303 includes synthesized images generated by a trained GAN. Upon obtaining the image dataset 303, the personalized fashion generation system provides images of the items to the trained neural network 317. Using the learned weights and parameters described above, the trained neural network 317 determines latent item features for each of the images, which are provided to the preference predictor 330.

Additionally, the preference predictor 330 correlates the latent item features for each item image in the image dataset 303 to the trained latent user features 321 to determine preference prediction scores for each item. As described above, the personalized fashion generation system can use the preference prediction scores to rank each item's compatibility with the user's fashion preferences. Then, using the preference prediction scores, the personalized fashion generation system can identify one or more items that are preferred by the user. For instance, the personalized fashion generation system selects the top-k (e.g., k>0) of items having the highest preference prediction scores. The personalized fashion generation system can then provide the identified items to the user, which is shown in FIG. 3B as the user-ranked personalized items 332.

Notably, while FIGS. 3A-3B illustrate one or more embodiments of a personalized preference network, the personalized fashion generation system can employ other types of personalized preference networks. Examples of other types of personalized preference networks include PopRank images (which ranks images in order of their popularity), WARP Matrix Factorization (which ranks images using weighted approximated ranking pairwise (WARP) loss), Bayesian Personalization Ranking-Matrix Factorization (which ranks images using standard matrix factorization), VisRank (which ranks images based on visual similarity using the pre-trained CNN features), Factorization Machines (which ranks images based on a generic factorization approach), and Visually-Aware Bayesian Personalization Ranking (which ranks images using a visually-aware personalized ranking from implicit feedback using of pre-trained convolutional neural network features of product images).

As mentioned above, the personalized fashion generation system can employ the trained personalized preference network 301 to rank user's fashion preferences for fashion items including items which the user has not yet interacted. In this manner, when the personalized fashion generation system combines the trained personalized preference network 301 with a trained GAN, the personalized fashion generation system can effectively determine preference prediction scores for a user with respect to the synthesized images newly generated for a user compared to existing images.

Figure 4A:
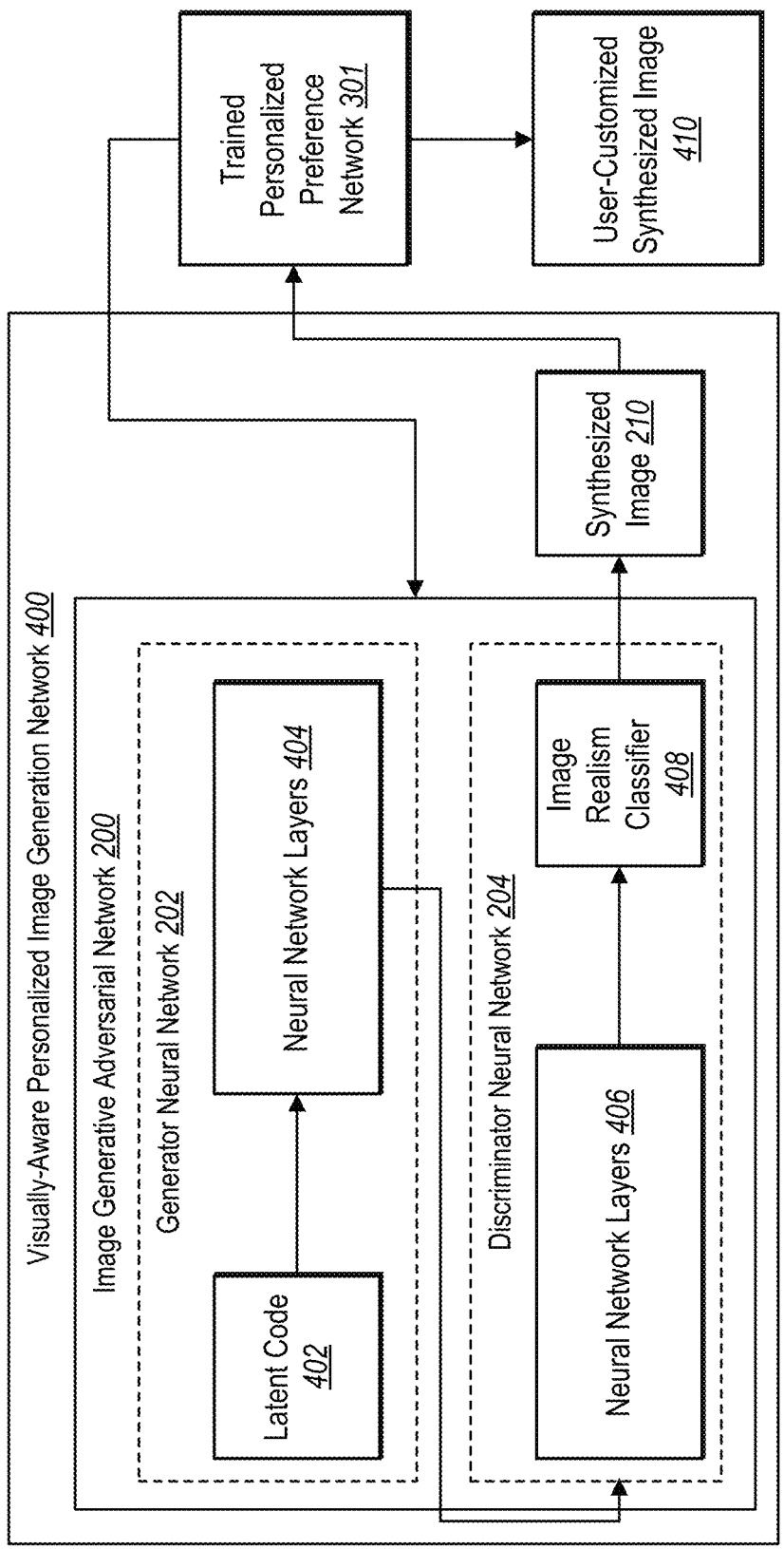
FIGS. 4A-4C illustrate diagrams of employing a trained visually-aware personalized image generation network to synthesize new fashion designs for a user in accordance with one or more embodiments.
Figure 4B:
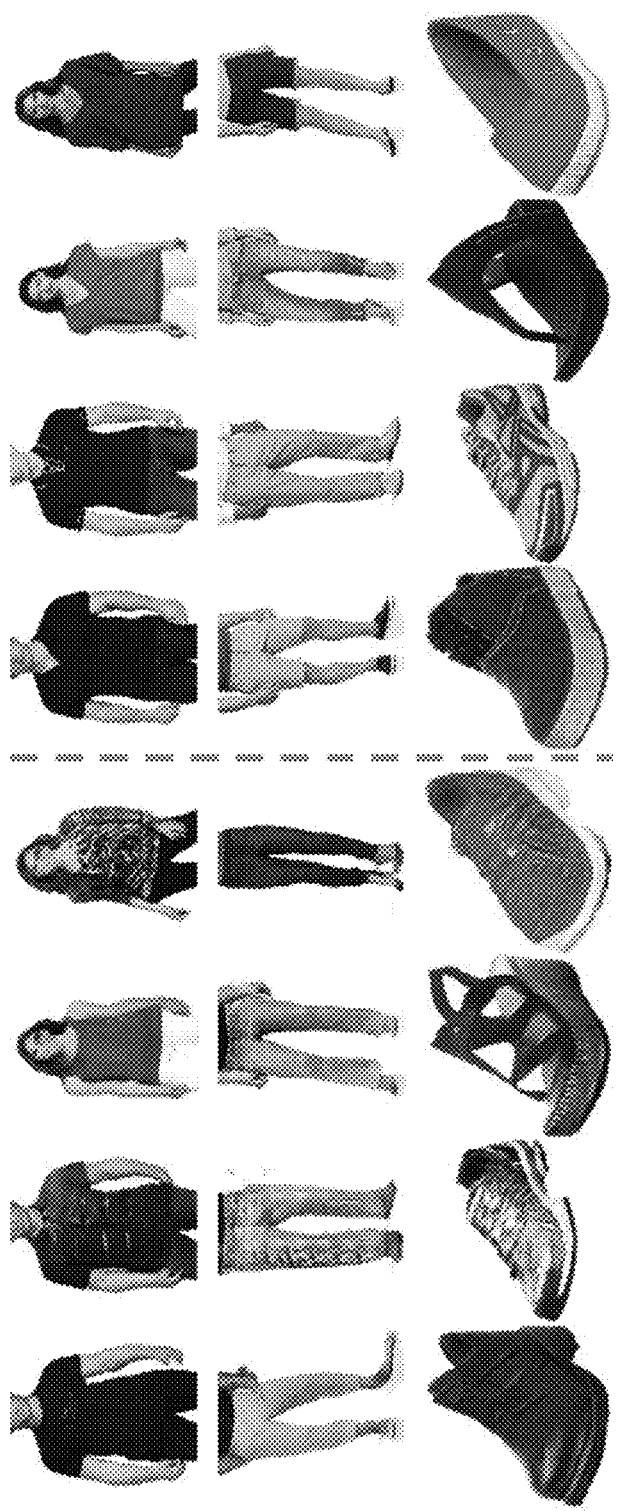
Figure 4C:
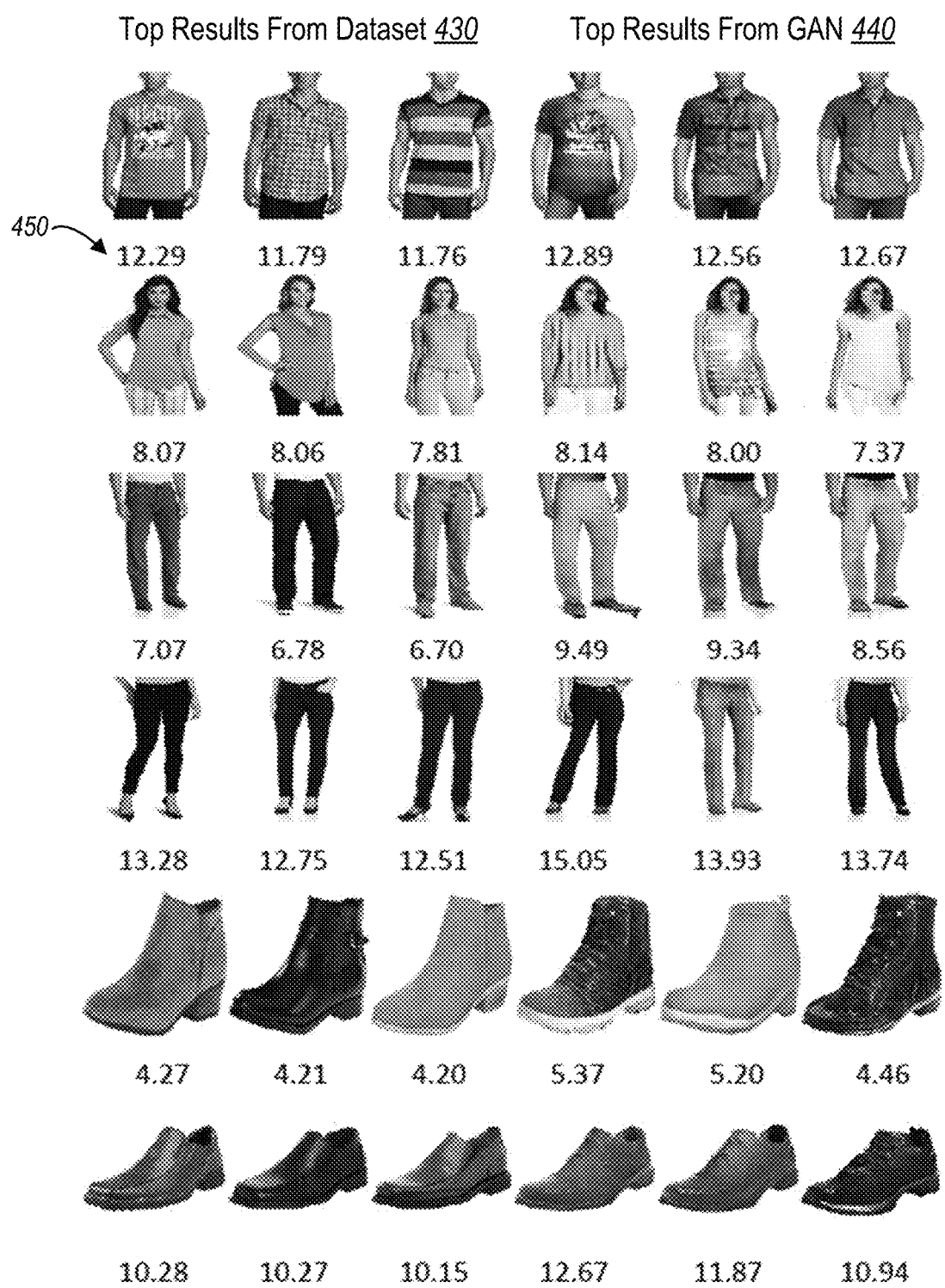

To illustrate, FIGS. 4A-4C illustrate diagrams of employing a trained visually-aware personalized image generation network 400 to synthesize new fashion design for a user. As shown, the visually-aware personalized image generation network 400 includes the image generative adversarial network 200 (or "GAN 200") and the trained personalized preference network 301. For instance, the GAN 200 in FIG. 4A represents one or more versions of the GAN 200 described above with respect to FIGS. 2A-2B. Similarly, the trained personalized preference network 301 in FIG. 4A represents one or more versions of the personalized preference network described above with respect to FIGS. 3A-3B.

To illustrate, as shown in FIG. 4A, the GAN 200 includes the generator neural network 202 (or "generator 202") and the discriminator neural network 204 (or "discriminator 204"). The generator 202 includes latent code 402 (e.g., the latent code 206) as well as neural network layers 404, as described above in connection with FIGS. 2A-2B. Additionally, the discriminator 204 includes neural network layers 406 as well as an image realness classifier 408 (e.g., the determination of whether an input image is a real image 214 or a fake image 216), as also described above in connection with FIGS. 2A-2B.

As explained earlier, the trained GAN 200 employs the trained generator 202 to generate synthesized images that match the quality and distribution of a training dataset by learning and reproducing visual latent features, often at the pixel-level. Accordingly, when the training dataset is a fashion item category, the GAN 200 designs and generates images of fashion items that would belong to the fashion category. Further, in some embodiments, the GAN can also employ the discriminator 204 to verify that generated synthesized images have a realistic appearance.

The trained personalized preference network 301 can determine preference prediction scores for the synthesized images generated by the GAN 200. For instance, in one or more embodiments, the personalized fashion generation system combines the GAN 200 and the trained personalized preference network 301 to apply latent user visual preferences such that the visually-aware personalized image generation network 400 creates synthesized images of new fashion items that are customized and unique to a given user.

To discover and design new fashion items for a user, in various embodiments, the personalized fashion generation system maximizes the preference prediction scores for a user from possible realistic synthesized images. To illustrate, as shown in FIG. 4A, the GAN 200 generates a synthesized image 210 that the personalized fashion generation system feeds to the trained personalized preference network 301. The trained personalized preference network 301 determines a preference prediction score for the synthesized image 210, which is provided back to the GAN 200. The GAN 200 then uses the feedback from the trained personalized preference network 301 to modify the latent code 402 to generate a synthesized image that better aligns with the user's preferences (e.g., yields a higher preference prediction score).

The personalized fashion generation system can iteratively repeat the above process for a set number of iterations. Additionally, or alternatively, the personalized fashion generation system can repeat the above process until a synthesized image meets a threshold preference prediction score or until a synthesized image improves to a threshold preference prediction percentage. In some embodiments, the personalized fashion generation system can iteratively repeat the above process until the synthesized image has a preference prediction score that is a threshold value above the highest preference prediction score of an existing fashion item in the same category for the user.

In additional embodiments, when the trained personalized preference network 301 is providing feedback to the GAN 200, the feedback can include latent information about the user's preferences. For example, the trained personalized preference network 301 provides one or more latent item features and/or latent user features to the GAN 200, which the GAN 200 uses to identify the latent code that better correlates to the given user. For example, based on receiving the trained latent user features 321 from the trained personal preference network, the GAN 200 maps one or more latent user features to random latent space to identify latent code that results in a synthesized image that is favorable to the user.

As mentioned above, the GAN 200 modifies the latent code 402 to change the appearance of the synthesized image 210 to match a user's visual preferences. In contrast, the neural network layers 404 remain unchanged (unless further training of the GAN 200 occurs). Indeed, by employing static weights and parameters within the neural network layers 404, the generator 202 can better determine how to modify the latent code using latent user features to produce a synthesized image that matches a user's visual preferences (e.g., the latent code is no longer random).

In some embodiments, the personalized fashion generation system also employs the discriminator 204 when generating synthesized images with the GAN 200. For example, the personalized fashion generation system uses the discriminator 204 to verify that a synthesized image satisfies the image realness classifier 408 before providing the synthesized image to the trained personalized preference network 301. Indeed, rather than providing a non-realistic image to the trained personalized preference network 301, the discriminator 204 can provide feedback to the generator 202 to vary the latent code used as input (e.g., latent input code) until a realistic image is generated. Additional detail, including equations, regarding employing the visually-aware personalized image generation network 400 to design and generate new synthesized images is provided below in connection with FIG. 6.

In additional embodiments, when the personalized fashion generation system employs the discriminator 204, the personalized fashion generation system trades off between maximizing a user's preference prediction score and image quality. For instance, the personalized fashion generation system uses a hyper-parameter that controls trade-offs between user preference score and image quality. In this manner, the personalized fashion generation system can determine when to provide a user with that a lower quality synthesized image that yields a higher preference prediction score for the user over a higher quality image that yields a lower preference prediction score.

When the personalized fashion generation system identifies latent code within random latent space that yields a satisfactory preference prediction score, the personalized fashion generation system can provide the user-customized synthesized image 410 to the user. For example, the personalized fashion generation system receives a request that indicates a given fashion category and user. In response, the personalized fashion generation system determines and generates the user-customized synthesized image 410 within the given category designed based on the user's tastes and preferences.

In various embodiments, the personalized fashion generation system provides multiple user-customized synthesized images to the user. For example, the personalized fashion generation system provides synthesized images to the user for a category having the top k preference prediction scores. However, in some instances, the top k images may appear similar to each other. Indeed, in these instances, providing the top k preference prediction scores can result in poor diversity.

To illustrate by way of a simple example, suppose a collection of synthesized images for a user includes red shirts, green shirts, and blue shirts. Also, suppose that the user prefers red over greed and blue. To arrive at a shirt that yields the highest preference prediction score, the personalized fashion generation system iterates through different shades of red. If the personalized fashion generation system provides the top k shirts that yield the highest preference prediction scores, the personalized fashion generation system may provide only red shirts to the user, as many red shirts outscored the preference prediction scores of green shirts and blue shirts.

Accordingly, to combat this problem, in various embodiments, the personalized fashion generation system performs probability sampling (e.g., probabilistic selection) when returning multiple user-customized synthesized images to ensure diversity among the provided results. Probability sampling prevents results from all looking alike. For example, the personalized fashion generation system selects the highest synthesized image for a category, then uses a weighted probability based on preference prediction scores to select other synthesized images that are favorable to the user. The personalized fashion generation system can employ various sampling techniques to improve diversity (e.g., random or semi-random selection). Additional detail regarding probability sampling is described below in connection with FIG. 6.

To illustrate results of the visually-aware personalized image generation network 400, FIG. 4B shows synthesized images 410 generated from the visually-aware personalized image generation network 400. In addition, FIG. 4B shows corresponding nearest neighbor images 420 from an image dataset (e.g., retrieved from the training dataset using only the trained personalized preference network 301).

As shown, FIG. 4B compares the synthesized images 410 from six different categories (e.g., men's tops, women's tops, men's bottoms, women's bottoms, men's shoes, and women's shoes) to their nearest neighbors (e.g., based on $L_1$ distance) in a dataset. As shown, the personalized fashion generation system generates synthesized images that are realistic and plausible, yet distinct from items in the dataset. Indeed, the personalized fashion generation system generates synthesized images 410 that have common shapes and color profiles, but that vary in style.

FIG. 4C illustrates further qualitative results. As shown, FIG. 4C includes fashion items with corresponding preference prediction scores that compare the top three results from an image dataset (i.e., dataset results 430 on the left) versus the top three results generated by the visually-aware personalized image generation network 400 (i.e., GAN results 440 on the right).

Each row in FIG. 4C corresponds to different users for a given product category. As shown, while the synthesized images in the GAN results 440 are distinct from the real images in the dataset results 430, the synthesized images visually share a similar style, indicating that the personalized fashion generation system has effectively captured the style preferences of each user.

As mentioned above, each image includes preference prediction score 450 that indicates the given user's favorability toward the items in the row. For the majority of users, even the third highest preference prediction score (e.g., the right most image in the GAN results 440) for a synthesized image is higher than the highest preference prediction score of a real item from the dataset (e.g., the left most image in the dataset results 430). In addition, for each user, the highest scored synthesized images are more favorable to the user than the highest scored item from the dataset indicating a clear preference by users for the user-customized fashion items over existing fashion items.

Moreover, when the dataset results 430 were compared to the GAN results 440 for 1,000 trials, researchers found that the GAN results 440 provided at least a 6.8% improvement over the dataset results 430 (e.g., a state-of-the-art image retrieval system). In addition, the researchers found that the GAN results 440 provided about the same amount of image quality and diversity as the dataset results 430, which indicates that the personalized fashion generation system adequately matches the image dataset in both quality and distribution (rather than generating noise and/or duplicative images).

Figure 5A:
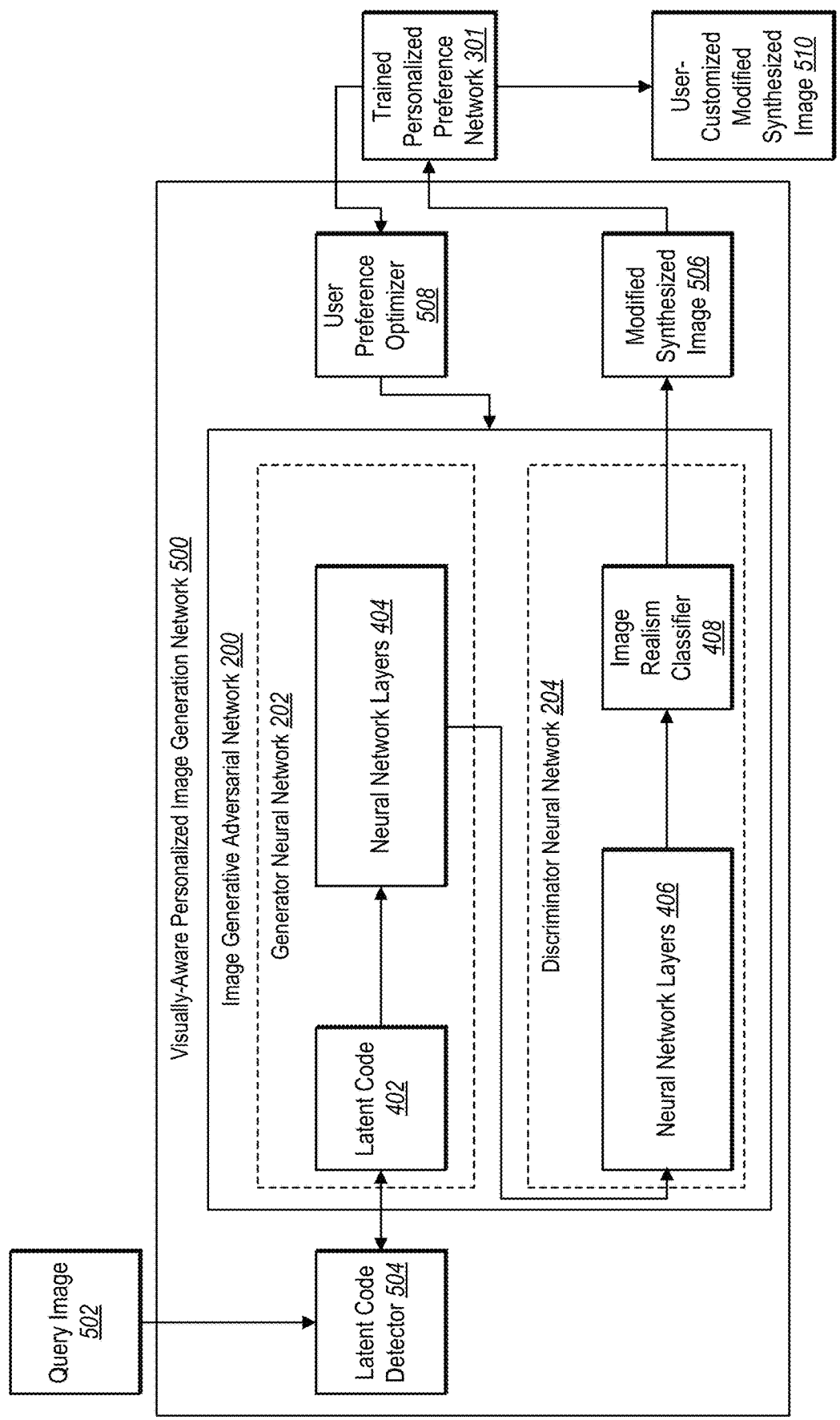
FIGS. 5A-5C illustrate diagrams of employing the trained visually-aware personalized image generation network to synthesize modified fashion designs for a user in accordance with one or more embodiments.
Figure 5B:
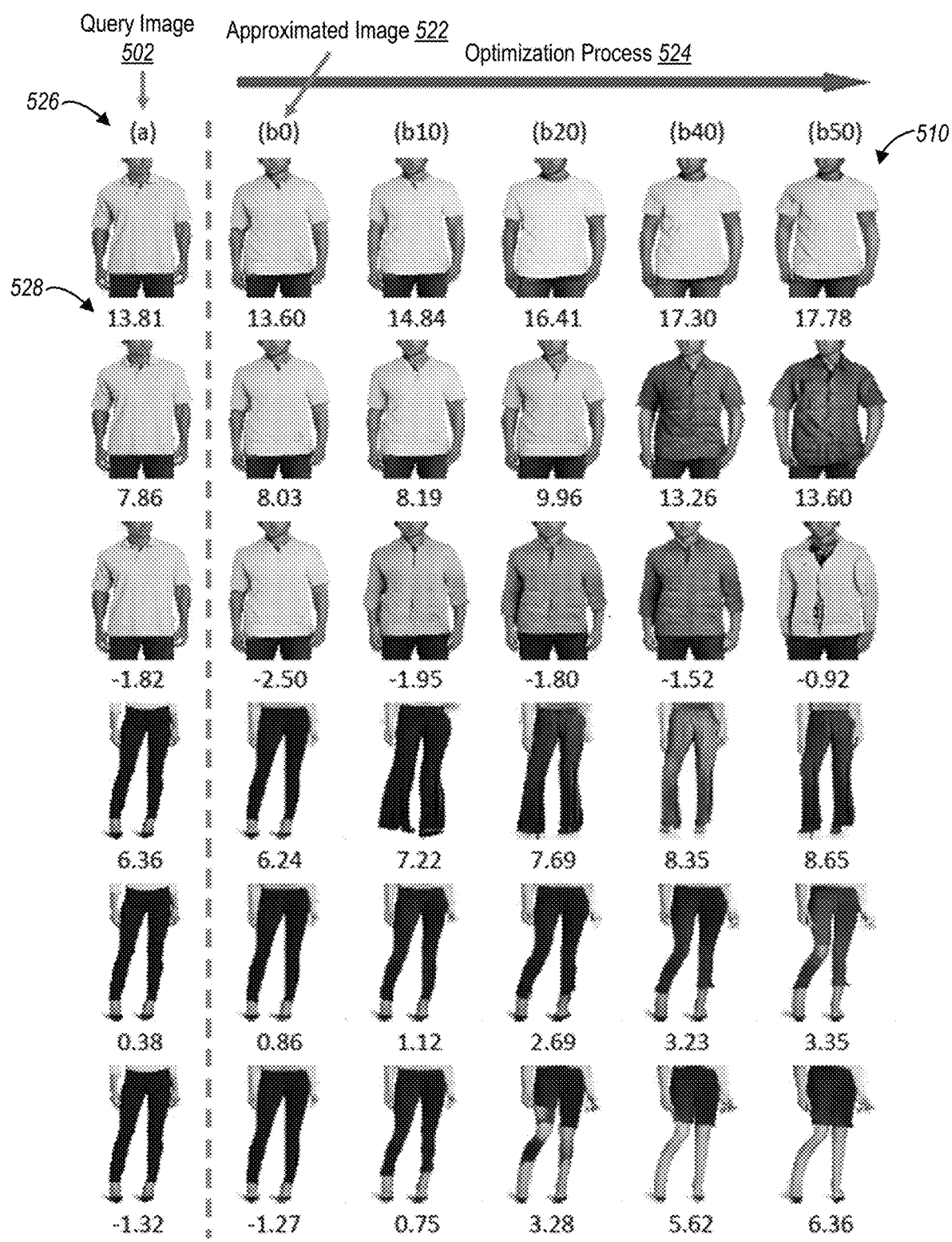
Figure 5C:
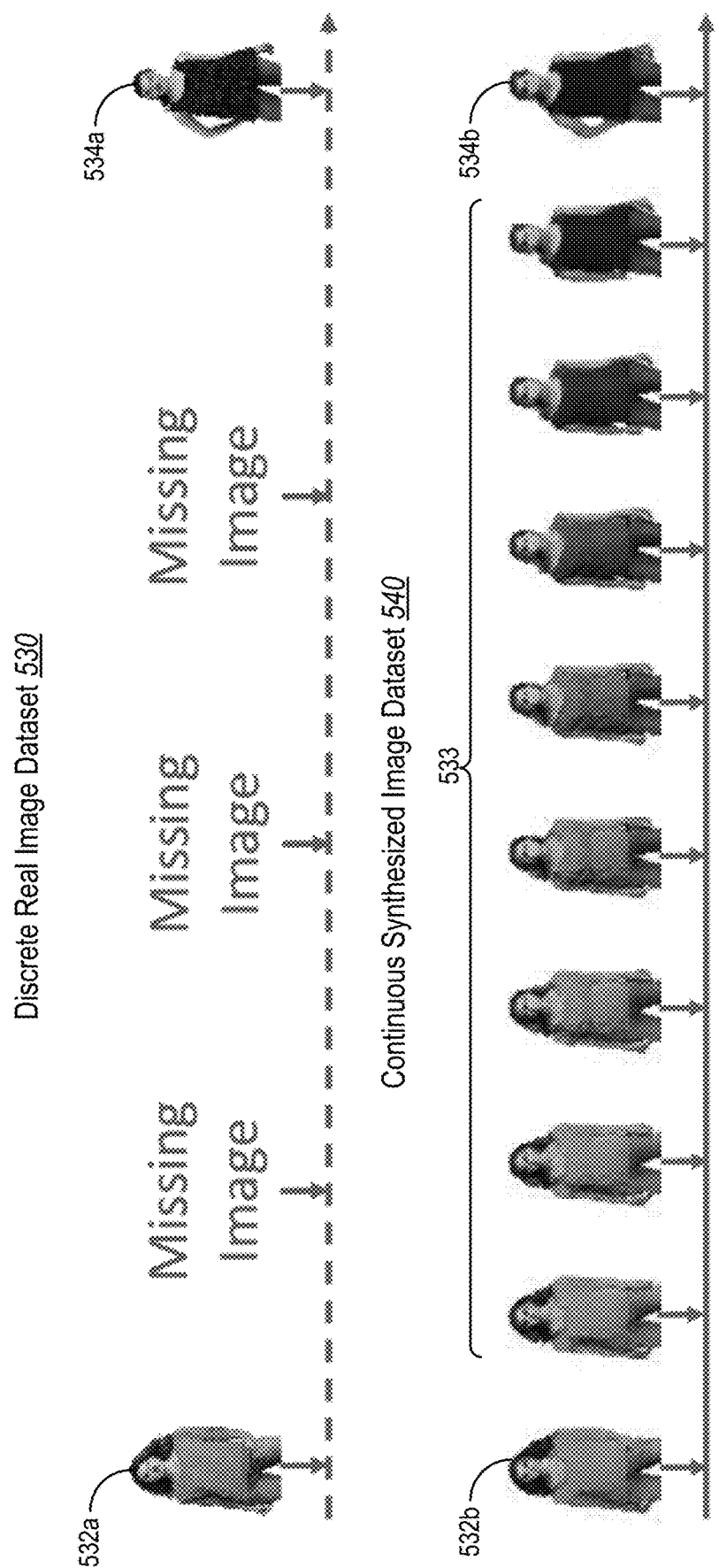

In addition to synthesizing new designs and fashions personalized for a user, the personalized fashion generation system can also modify existing fashion items to better match a user's tastes and preferences. To illustrate, FIGS. 5A-5C show diagrams of employing a trained visually-aware personalized image generation network 500 to synthesize modified fashion designs for a user. As shown, the visually-aware personalized image generation network 500 includes the image generative adversarial network 200 (or "GAN 200") and the trained personalized preference network 301. In addition, the visually-aware personalized image generation network 500 includes a latent code detector 504 that communicates with the GAN 200 as well as a user preference optimizer 508, which are each discussed below.

The GAN 200 shown in FIG. 5A includes the same components shown in FIG. 4A, as described above. For example, the GAN 200 includes the generator 202 having the latent code 402 and the trained neural network layers 404. In addition, the GAN 200 includes the discriminator 204 having the trained neural network layers 406 and the image realism classifier 408.

As mentioned above, the personalized fashion generation system uses the trained GAN 200 and the trained personalized preference network 301 to modify existing fashion items to suit a user's preferences. To illustrate, the personalized fashion generation system can receive a request to modify the query image 502 for the user. In response, the personalized fashion generation system obtains a query image 502. Alternatively, the personalized fashion generation system generates modifications to the query image 502 without first receiving a request.

In one or more embodiments, the personalized fashion generation system obtains the query image 502 based on detecting that the user is interacting with a fashion item represented by the query image 502. In some embodiments, another source or system (e.g., a third-party) provides the query image 502. In various embodiments, the query image 502 corresponds to a fashion item preferred by the user (e.g., the query image 502 item yields a favorable preference prediction score for the user). In alternative embodiments, the query image 502 is less desirable or undesirable to the user before having modifications applied.

Upon obtaining the query image 502 of a fashion item, the personalized fashion generation system can find latent code that visually resembles the query image 502. For example, in one or more embodiments, the personalized fashion generation system employs the latent code detector 504 to identify the latent code in the learned random latent space of the GAN 200 that best approximates the image. In particular, the personalized fashion generation system iteratively searches for a latent code having the smallest $L_1$ distance between a corresponding image generated by the GAN 200 and the query image 502.

Using the identified latent code that approximates the query image 502, the personalized fashion generation system can begin modifying the query image 502 based way on the approximated latent code. Indeed, the personalized fashion generation system uses the identified latent code as the latent code 402 to generate a synthesized image using the generator 202.

The personalized fashion generation system can employ a similar process as described with respect to FIG. 4A involving the GAN 200 and the trained personalized preference network 301 to modify the latent code 402 to maximize a user's preference and generate a favorable synthesized image for the user. For instance, the personalized fashion generation system can use the generator 202 to generate a modified synthesized image 506 from latent code and the discriminator 204 to verify that the modified synthesized image 506 appears realistic.

In addition, in various embodiments, the personalized preference network provides feedback to the GAN 200 based on the preference prediction score of the modified synthesized image 506, which in turn updates the latent code 402 until a favorable preference prediction score is achieved (or for a set number of positive iterations that increase the preference prediction score). In some embodiments, at this stage, the personalized fashion generation system then presents the modified versions of the query image 502 to the user, shown as the optimal user-customized modified synthesized image 510. In this manner, the personalized fashion generation system tailors fashion items to a user's personal tastes and preferences.

Rather than providing the modified synthesized image 506 to the user at this stage, in one or more embodiments, the personalized fashion generation system can perform further optimizations. To illustrate, as mentioned above, the visually-aware personalized image generation network 500 includes the user preference optimizer 508. In one or more embodiments, the personalized fashion generation system can further improve the correlation between the modified synthesized image 510 and the user's preference. As a note, the personalized fashion generation system can similarly apply the user preference optimizer 508 to the visually-aware personalized image generation network 400 described above in FIG. 4A to further optimize the user-customized synthesized image 410 provided to the user.

Returning to FIG. 5A, the personalized fashion generation system can employ the user preference optimizer 508 to further optimize the process of finding latent code in random latent space. Conceptually, the user preference optimizer 508 searches adjacent locations in the learned random latent space of the GAN 200 to determine if adjacent latent codes exist that more closely correlates with latent user features of a user.

To illustrate, the user preference optimizer 508 introduces latent code constraints. In one or more embodiments, the user preference optimizer 508 constrains latent code by applying a mapping function that maps the latent code to a specified range. For instance, the mapping function employs a hyperbolic tangent function (i.e., $\tan h(z)$) to map real numbers to the range of $[-1, 1]$. By shifting latent code to a constrained space, the personalized fashion generation system can more efficiently apply search functions, such as stochastic gradient (e.g., ascent or decent) to identify optimal latent code that correlates with latent user features. Indeed, constraining the latent code ensures that results of search functions falls within range of the learned random latent space.

Additionally, the user preference optimizer 508 can also employ a multi-sampling function to optimize the latent code 402. For instance, the user preference optimizer 508 samples different initial points within the random latent space for a predetermined number sample points (e.g., 64 points or another number). For each sample point, the user preference optimizer 508 repeats the optimization process of searching the constrained space for latent code that yields a higher preference prediction score. Indeed, sampling different initial points helps prevent the user preference optimizer 508 from falsely selecting a local-optimum of latent code when other latent code within the learned random latent space yields higher preference prediction scores for the user.

After sampling the various points, the user preference optimizer 508 selects the latent code that yields the highest preference prediction score by the trained personalized preference network 301. In addition, the user preference optimizer 508 provides the optimal latent code to the GAN 200, which generates a user-customized synthesized image 410/user-customized modified synthesized image 510 and provides the synthesized image to a user. As shown in FIG. 5A, after performing optimization, the visually-aware personalized image generation network 500 provides the user-generated modified synthesized image 510 to the user.

By way of qualitative results, FIG. 5B shows the process of modifying and optimizing a query image 502 using the visually-aware personalized image generation network 500 to generate a user-customized modified synthesized image 510. To illustrate, FIG. 5B includes rows of images where each row corresponds to a different user. In particular, the top three rows correspond to three different male users and the category of men's shirts and the bottom three rows correspond to three different female users and the category of women's pants. As a note, the query image 502 for each of the men is the same, and the query image 502 for each of the women is the same.

Each row in FIG. 5B begins with a query image 502 on the left. The next image is an approximated image 522, or a synthesized image based on the latent code identified by the latent code detector 504 described above. As shown, each approximated image 522 is very similar to the query image 502. Additional images in a row correspond to results of the optimization process 524 over various iterations 526 of GAN optimization. For instance, the last image in each row (the right-most image) can represent the user-generated modified synthesized image 510 presented to a user after 50 iterations of GAN optimization.

As shown, preference prediction scores 528 for each user is provided below each image. As also shown, the preference prediction scores for users improves over the query image 502 as the number of iterations 526 increase. Indeed, with each iteration, the personalized fashion generation system further modifies the fashion item to be more preferable to the corresponding user.

Further, as shown, the personalized fashion generation system applies different modifications to the query image 502 and subsequent modified synthesized images based on each user's individual personal visual preferences. To illustrate, as mentioned above, the query image 502 of the men's shirt (e.g., top three rows) is the same. However, the user-generated modified synthesized image 510, as well as images with fewer iterations, are distinct between the three corresponding users. Indeed, the personalized fashion generation system employs the visually-aware personalized image generation network 500 to uniquely apply modifications and designs that are uniquely tailored to each user's preferences.

A similar result is shown with the bottom three users. While the query image 502 is the same pair of women's pants, the user-generated modified synthesized image 510 of the first women user (e.g., fourth row) shows long pants, the user-generated modified synthesized image 510 of the second women user (e.g., fifth row) shows cropped pants (capris), and the user-generated modified synthesized image 510 of the third women user (e.g., sixth row) shows shorts. Further, the three the user-generated modified synthesized images vary in color from one another.

In one or more embodiments, the personalized fashion generation system can identify modified styles and designs based on multiple query images. For example, a user provides, or the personalized fashion generation system detects, two fashion items that are favored by the user. The personalized fashion generation system identifies the latent code for each fashion item and identifies a continuum of fashion designs between the two images. To illustrate, FIG. 5C shows the continuous nature of the personalized fashion generation system compared to a discrete dataset.

As shown, FIG. 5C includes a discrete real image dataset 530. In particular, the discrete real image dataset 530 includes a first fashion item 532a and a second fashion item 534a. Based on this discrete real image dataset 530, a user can choose only the first fashion item 532a or the second fashion item 534a.

FIG. 5C also includes a continuous synthesized image dataset 540, which represents synthesized images created by the visually-aware personalized image generation network 500. The continuous synthesized image dataset 540 also includes the first fashion item 532b and the second fashion item 534b. Additionally, the continuous synthesized image dataset 540 also includes multiple synthesized fashion items 533 that fall between the styles and appearances of the first fashion item 532b and the second fashion item 534b. In this manner, the user is not limited to either the first fashion item 532a or the second fashion item 534a as with the discrete real image dataset 530.

Further, if the user desires a fashion item between the first fashion item 532a and one of the multiple synthesized fashion items 533, the visually-aware personalized image generation network 500 can generate additional synthesized fashion items within the selected range. Thus, in addition to providing users with a near-limitless range of fashion items, the personalized fashion generation system also generates potential fashion items and styles that are highly desirable to the user.

Figure 6:
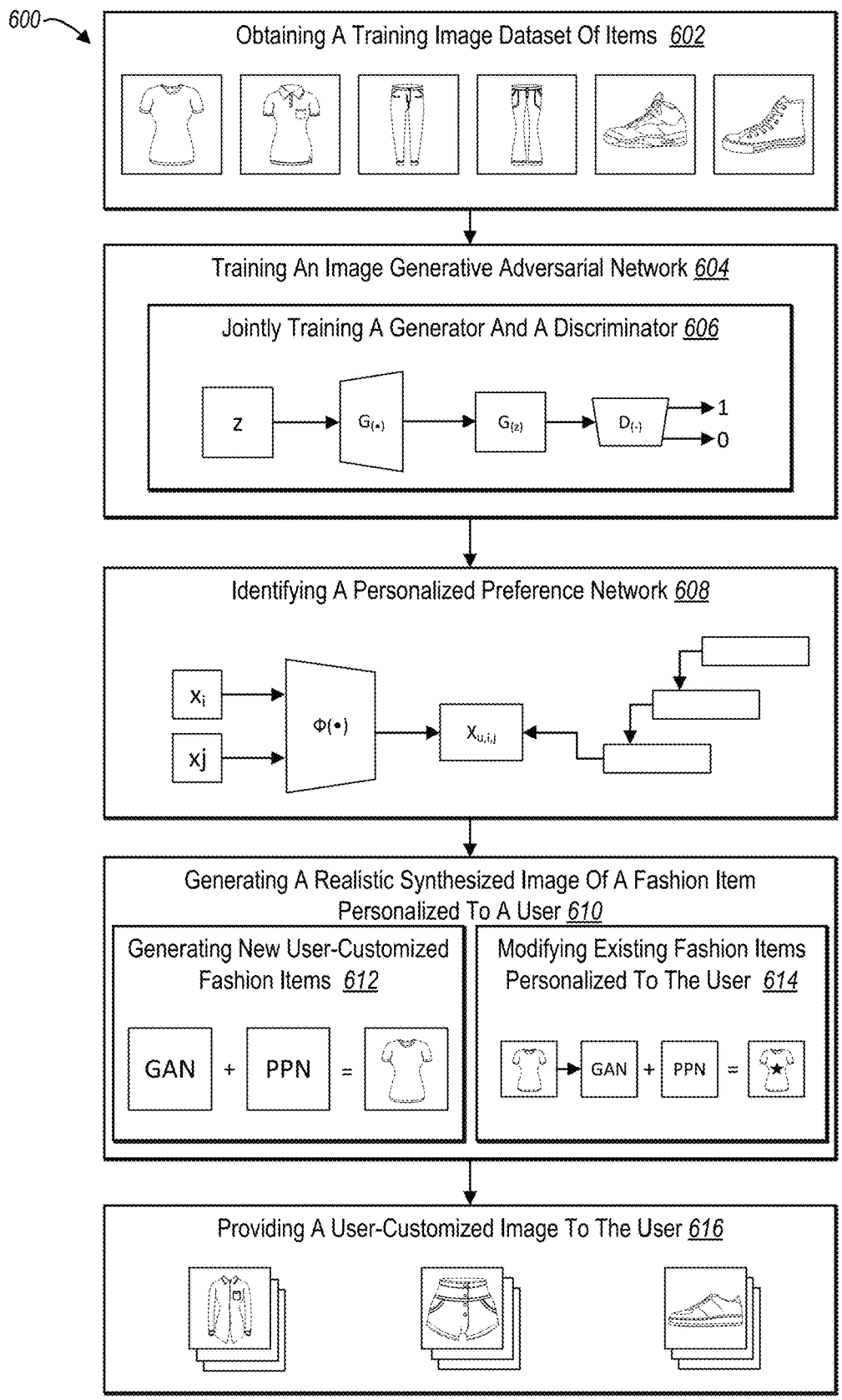
FIG. 6 illustrates acts in performing a step for training a generative adversarial image network to generate realistic images of fashion items for a given category as well as acts in performing a step for generating a realistic synthetic fashion image for an item in the given category using the trained generative adversarial image network and the identified latent fashion preferences of the user in accordance with one or more embodiments.

Moving to the next figure, FIG. 6 illustrates acts 600 in performing a step for training a generative adversarial image network to generate realistic images of fashion items for a given category as well as acts in performing a step for generating a realistic synthesized fashion image for an item in the given category using the trained generative adversarial image network and the identified latent fashion preferences of the user in accordance with one or more embodiments. In various embodiments, the personalized fashion generation system described herein performs the series of acts 600. In some embodiments, the personalized fashion generation system is located on a server device and performs one or more of the series of acts 600 in connection with a client device.

As shown, the series of acts 600 includes an act 602 of obtaining a training image dataset of items. In various embodiments, the images (e.g., 128×128, 224×224, or another size) correspond to fashion items, some of which the user has interacted with and provided feedback. In alternative embodiments, the images correspond to a differ domain of items with which the user interacts and provides feedback.

In one or more embodiments, the personalized fashion generation system uses U to denote a set of users and I to denote items in a dataset. Further, each item i within the items I (i.e., i∈I) is associated with an image, denoted $X_i$. These notations are used below.

As FIG. 6 also illustrates, the series of acts 600 includes an act 604 of training an image generative adversarial network (or "GAN"). As mentioned above, the GAN includes a generator neural network (or "generator G") and a discriminator neural network (or "discriminator D"), where the generator G creates images from latent code vectors and the discriminator D determines whether synthesized images generated by the generator G are realistic. In some embodiments, the generator G and the discriminator D are implemented as multi-layer convolutional or deconvolutional neural networks, as explained earlier.

As shown, the act 604 of training the GAN can include jointly training 606 the generator and the discriminator. For instance, the generator G takes as inputs a random noise vector (i.e., z~U(−1, 1)) and a category (i.e., c) and synthesizes an image. The discriminator D takes an image (i.e., x) sampled either from training dataset (i.e., $X_c$) or from one of the synthesized images of the generator G. Based on the input image, the discriminator D predicts the likelihood of the image being 'real' (e.g., belonging to the training set $X_c$).

In one or more embodiments, the personalized fashion generation system trains the GAN by using a least squares loss. By employing least squares loss, the personalized fashion generation system can employ the GAN to generate high quality synthesized images. To illustrate, in various embodiments, the personalized fashion generation system employs the objective functions shown below in Equation 1 using to least squares loss train the generator G and the discriminator D.

$$\min_G V(G) = \mathbb{E}_{c\sim p(c),z\sim p(z)} L_{real} G(z, c), c\Big)$$

$$\min_D V(D) =$$

$$\mathbb{E}_{x,c\sim p_{data}(x,c)} L_{real}(x, c) + \mathbb{E}_{c\sim p(c),z\sim p(z)} L_{fake} G(z, c), c\Big)$$

(1)

As shown, Equation 1 includes a loss minimization function for generator G and discriminator D. Also, in Equation 1, $L_{real}$ (x, c) equals $[D(x,c)-1]^2$ and $L_{fake}$ (x, c) equals $[D(x,c)]^2$. In this manner, the discriminator D learns to predict "1" for real images and "0" for fake images, while the generator G learns to generate realistic synthesized images to fool the discriminator D. In one or more embodiments, the personalized fashion generation system alternatively optimizes these two opposing objective functions until the quality of synthesized image generated by the generator G is acceptable (e.g., around 25 epochs).

In various embodiments, the personalized fashion generation system employs the GAN architecture shown in FIG. 2B. For example, the GAN architecture shown in FIG. 2B provides a deeper conditional neural network than many conventional systems. Indeed, some conventional GAN generates dream-like hallucinations of natural images. In contrast, the personalized fashion generation system generates realistic and high quality synthesized images. In some instances, the difference in quality and realness is based on focusing on and training with a relatively small domain (e.g., clothing images that use a limited number of canonical poses).

As shown in FIG. 6, the series of acts 600 includes an act 608 of identifying a personalized preference network. In one or more embodiments, the act 608 includes creating, training, and employing a personalized preference network. When training the personalized preference network, in various embodiments, the act 608 includes training the personalized preference network to identify fashion preferences for a user and a given category. In alternative embodiments, the act 608 includes obtaining a pre-trained personalized preference network.

After being trained, the personalized preference network identifies visually-aware latent fashion preferences (e.g., latent user features) for the user on a fashion category level. In some instances, the personalized preference network discovers latent user features of the user based on implicit feedback. Alternatively, the personalized preference network discovers latent fashion preferences of the user based on explicit feedback, such as user reviews, comments, "likes" and/or product shares.

As mentioned above, a personalized preference network scores or ranks a user's preference for items, particularly preferences based on visual features of items. For example, given a set of images (real or synthesized images), the personalized preference network can score and rank each of the images based on how favorable each of the images is to a given user. Indeed, in many embodiments, the trained personalized preference network correlates latent user features with latent item features generated from an image to determine a preference prediction score for the image, such as images of fashion items. Additional detail regarding personalized preference networks is provided above with respect to FIGS. 3A-3B.

Additionally, as shown in FIG. 6, the series of acts 600 includes an act 610 of generating a realistic synthesized image of a fashion item personalized to a user. In particular, the act 610 can involve generating a realistic synthesized image for a fashion item in a given category for the user using the trained GAN and the trained personalized preference network. In some instances, the personalized fashion generation system also determines a realistic synthesized image based on the identified latent fashion preferences of the user.

As shown as part of the act 610, the personalized fashion generation system can generate 612 new user-customized fashion items. Alternatively, as shown as part of the act 610, the personalized fashion generation system can modify 614 existing fashion items personalized to the user. Generating new user-customized fashion items and generating modified user-customized fashion items are described below in turn.

As mentioned above, the personalized fashion generation system employs the trained GAN and the trained personalized preference network to generate 612 new user-customized fashion items. Indeed, the personalized fashion generation system enables a user to explore the space of potentially desirable items that may not yet exist. In this manner, the personalized fashion generation system can maximize a user's preference (i.e., preference maximization) by generating new items that best match a user's personal style.

To illustrate, in one or more embodiments, the personalized fashion generation system builds upon the concept of identifying user-preferred items in a dataset of existing items (e.g., item retrieval). For example, given a user (i.e., u) and a category (i.e., c), the personalized fashion generation system can retrieve existing items in the dataset to maximize a user's preference score, as shown in Equation 2 below.

$$\delta(u, c) = \underset{e \in X_c}{\operatorname{argmax}} x_{u,e} = \underset{e \in X_c}{\operatorname{argmax}} \theta_u^T \Phi(e) \qquad (2)$$

In Equation 2, $X_c$ represents the set of item images belonging to category c and e represents an existing item in the dataset. In addition, $\theta_u^T$ represents visual user-item preferences, $\Phi(\bullet)$ represents a convolutional network for feature extraction. Accordingly, in various embodiments, the personalized preference network is represented by $\theta_u^T \Phi(\bullet)$, where the personalized preference network correlates latent user features (e.g., $\theta_u^T$) with latent item features generated from an image (e.g., the result of $\Phi(\text{image})$) to determine a preference prediction score for the image.

While Equation 2 selects a 'real' image from an existing image dataset, the personalized fashion generation system can employ the trained GAN to generate synthesized images that have an approximated distribution as a training dataset (e.g., the image dataset of items). For instance, the personalized fashion generation system modifies Equation 1 to include the GAN, as shown in Equation 3 below.

$$\hat{\delta} = \underset{e \in G(\bullet,c)}{\operatorname{argmax}} \hat{x}_{u,e} \qquad (3)$$
$$= \underset{e \in G(\bullet,c)}{\operatorname{argmax}} x_{u,e} - \eta L_{real}(e, c)$$
$$= G\left[\underset{z \in [-1,1]^{100}}{\operatorname{argmax}} \theta_u^T \Phi[\Delta G_c(z)] - \eta [D_c(G_c(z)) - 1]^2, c\right]$$

In Equation 3, $G_c(\bullet)$ represents the generator G of the GAN for the given category c and z represents the latent code used as input for the generator G. Accordingly, $G_c(z)$ represents the synthesized image generated based on the latent code z for the category c. Also, $D_c(x)$ represents the discriminator D trained to classified fashion images in the category c as real or fake. Because the discriminator D outputs a value of "1" when an input image is realistic and "0" when the input image is fake, a realistic image minimizes the discriminator portion of Equation 3.

In addition, in Equation 3, 4 represents an image upscaling operator that resizes an RGB image from 128×128 pixels to 224×224 pixels. In one or more embodiments, the personalized fashion generation system employs nearest-neighbor scaling. In alternative embodiments, personalized fashion generation system employs other differentiable image scaling algorithms.

Further, in Equation 3, the term $\eta L_{real}(e,c)$ controls the image quality via the trained discriminator D. In particular, $\eta$ represents a hyper-parameter that controls the trade-off between preference prediction scores and image quality. As $\eta$ increases and image quality improves, the preference prediction score for a user drops. Accordingly, through testing, researchers have found that a hyper-parameter of $\eta=1$ provides an optimal balance between preference prediction scores for a user and ample image quality. Further, these researchers discovered that when $\eta=1$, the personalized fashion generation system outperform state-of-the-art image retrieval systems.

As shown in Equation 3, the personalized fashion generation system searches for latent code (i.e., z) in the random latent space of the GAN that maximizes a user's preference prediction score. Using the identified latent code, the personalized fashion generation system employs the generator G to generate a synthesized image. Thus, the output of Equation 3 is a synthesized image for the given category that is based on a user's visual tastes and preferences.

In some embodiments, the personalized fashion generation system further optimizes Equation 3. For example, as mentioned above, the personalized fashion generation system searches the learned random latent space of the GAN for adjacent latent code that yields a higher preference predictor score from the preference predictor network than the previously determined latent code. To illustrate, the personalized fashion generation system optimizes searching for latent code that correlates to a user's visual latent user features, as shown below in the optimization problem included in Equation 4.

$$\underset{z' \in \mathbb{R}^{100}}{\max} \theta_u^T \Phi[\Delta G_c(\tanh(z'))] - \eta [D_c(G_c(\tanh(z'))) - 1]^2 \qquad (4)$$

As part of optimizing the process of identifying latent code that correlates to a user's latent user features, as shown below in Equation 4, the personalized fashion generation system maps the latent code to a constrained space. For instance, the personalized fashion generation system employs an auxiliary latent code variable $z' \in \mathbb{R}^{100}$ that constrains the latent code used as input (i.e., $z \in [-1, 1]^{100}$), where z equals tan h(z'). Indeed, Equation 4 serves as a mapping function that maps any real number to a range within $[-1, 1]$.

In various embodiments, the personalized fashion generation system employs a stochastic gradient function, such as gradient ascent (or decent) to identify a user-preferred (e.g., Equation 3) and/or optimal (e.g., Equation 4) latent code used as input. Because stochastic gradient functions can often find solutions that are beyond the bounds of the learned random latent space of the GAN, applying the mapping function controls the range and ensures that employing gradient ascent yields viable solutions.

To illustrate, when applying a stochastic gradient function, in some embodiments, the personalized fashion generation system samples initial points within the random latent space. For example, the personalized fashion generation system draws $z \sim U[-1, 1]$ and sets z' to tan $h^{-1}(z')$. In particular, the personalized fashion generation system sets z' to ½[ln(1+z)–ln(1−z)], where the personalized fashion generation system applies tan $h^{-1}(\bullet)$ and ln($\bullet$) elementwise. Accordingly, the personalized fashion generation system can employ Equation 4 to employ gradient ascent within the constrained space to iteratively identify an optimized latent code that yields a higher preference predictor score from the preference predictor network than a previously determined latent code.

When searching for optimal latent code using the above equations, the personalized fashion generation system can identify many local optima. Accordingly, in some embodiments, the personalized fashion generation system repeats the optimization process from m random initial points to get a high-quality solution. For example, the personalized fashion generation system selects m=64 random initial points. In other examples, the personalized fashion generation system selects a larger or fewer number of initial points. While adding an additional number of initial points may yield a better overall solution, it also requires additional time and computational processing.

Upon performing the optimization process from the randomly selected initial points, the personalized fashion generation system selects the identified latent code used as input that results in the highest objective value after optimization (e.g., the highest preference prediction score). Then, using the selected optimal identified latent code, the personalized fashion generation system generates a synthesized image of a new fashion item.

As mentioned above, the personalized fashion generation system employs the trained GAN and the trained personalized preference network to modify 614 existing fashion items personalized to the user. For instance, the personalized fashion generation system makes minor modifications to an existing fashion item such that the item better matches the preferences of a user. In other instances, the personalized fashion generation applies larger modifications based on a user's preferences. In this manner, the personalized fashion generation system can employ preference maximization to tailor existing items to better match a user's personal style.

As described above, the personalized fashion generation system can generate new images using the trained GAN and the trained personalized preference network that are personalized to user. When synthesizing new images, the personalized fashion generation system randomly selects one or more initial points within the random latent space of the GAN, then iteratively searches for latent code that yields more-personalized results for a user.

When modifying an existing item, rather than starting with a random point in the latent GAN space (e.g., random latent space), in various embodiments, the personalized fashion generation system selects latent code that best matches the existing item to be modified. Indeed, the personalized fashion generation system identifies latent code that approximates the existing item. Equation 5 below shows an optimization process of finding a latent code (i.e., z) that is approximate to a query image (i.e., $X_{query}$).

$$\min_{z' \in \mathbb{R}^{100}} = \|G_c(\tanh(z')) - \nabla X_{query})\| \qquad (5)$$

In Equation 5, $\nabla$ represents an image downscaling operator. Other components of Equation 5 are described above. In particular, Equation 5 employs $L_1$ reconstruction error to approximate latent code used as input by minimizing the $L_1$ distance between the approximate latent code and the query image. As shown in Equation 5, the personalized fashion generation system finds the latent code that best represents the query image when generated into a synthesized image by the generator G. The identified latent code approximates the query image but is not yet personalized to the user. Visual examples of a query image and an approximated image are shown in FIG. 5B, which is described above.

Upon identifying latent code that approximates the query image, the personalized fashion generation system can begin modifications to customize the fashion item to suit a user's preferences. For example, in various embodiments, the personalized fashion generation system employs the optimization process described above to generate a synthesized image that appears as a modification to the query image. In particular, the personalized fashion generation system employs the optimization process described with respect to Equation 4 (which modifies Equation 3) above to discover optimal latent code in adjacent random latent space of the GAN that yields a higher preference prediction score for the user than the query image As shown in FIG. 6, the series of acts 600 includes an act 616 of providing a user-customized image to the user. For example, the personalized fashion generation system provides a synthesized image of a new fashion item to the user. Additionally, or alternatively, the personalized fashion generation system provides a synthesized image of a modified fashion item to the user. For example, the personalized fashion generation system provides the synthesized image to a client device associated with the user.

In addition, the personalized fashion generation system can expand the above actions to generate multiple synthesized images that suit a user's preferences. In one or more embodiments, the personalized fashion generation system returns the top-k synthesized images to a user (e.g., the top-k synthesized images that yield the highest preference prediction scores). For example, when the personalized fashion generation system optimizes based on selecting m random initial points, as described above, in some embodiments, the personalized fashion generation system ranks the m images $\{e_1, e_2, \ldots, e_m\}$ according to their objective values (i.e., $\hat{x}_{u,e}$).

In some cases, as described above, providing the top-k synthesized images to a user results in poor diversity. Accordingly, in various embodiments, the personalized fashion generation system can perform sampling using a probabilistic selection algorithm to improve the diversity among returned synthesized images. In particular, Equation 6 below shows a softmax probability sampling function, where et represents a selection probability.

$$p(e_t) = \frac{\exp(\hat{x}_{u,e_t})}{\sum_{d=1}^{d=m} \exp(\hat{x}_{u,e_d})} \qquad (6)$$

As shown in Equation 6, the personalized fashion generation system can employ a deterministic approach to choose different looking synthesized images to return to the user when providing multiple synthesized image results to the user. Indeed, the probabilistic selection algorithm shown in Equation 6 enables synthesized images that yield a higher personalized preference network to have a higher probability of being selected while also diversifying the selection of synthesized images provided to a user.

Figure 7:
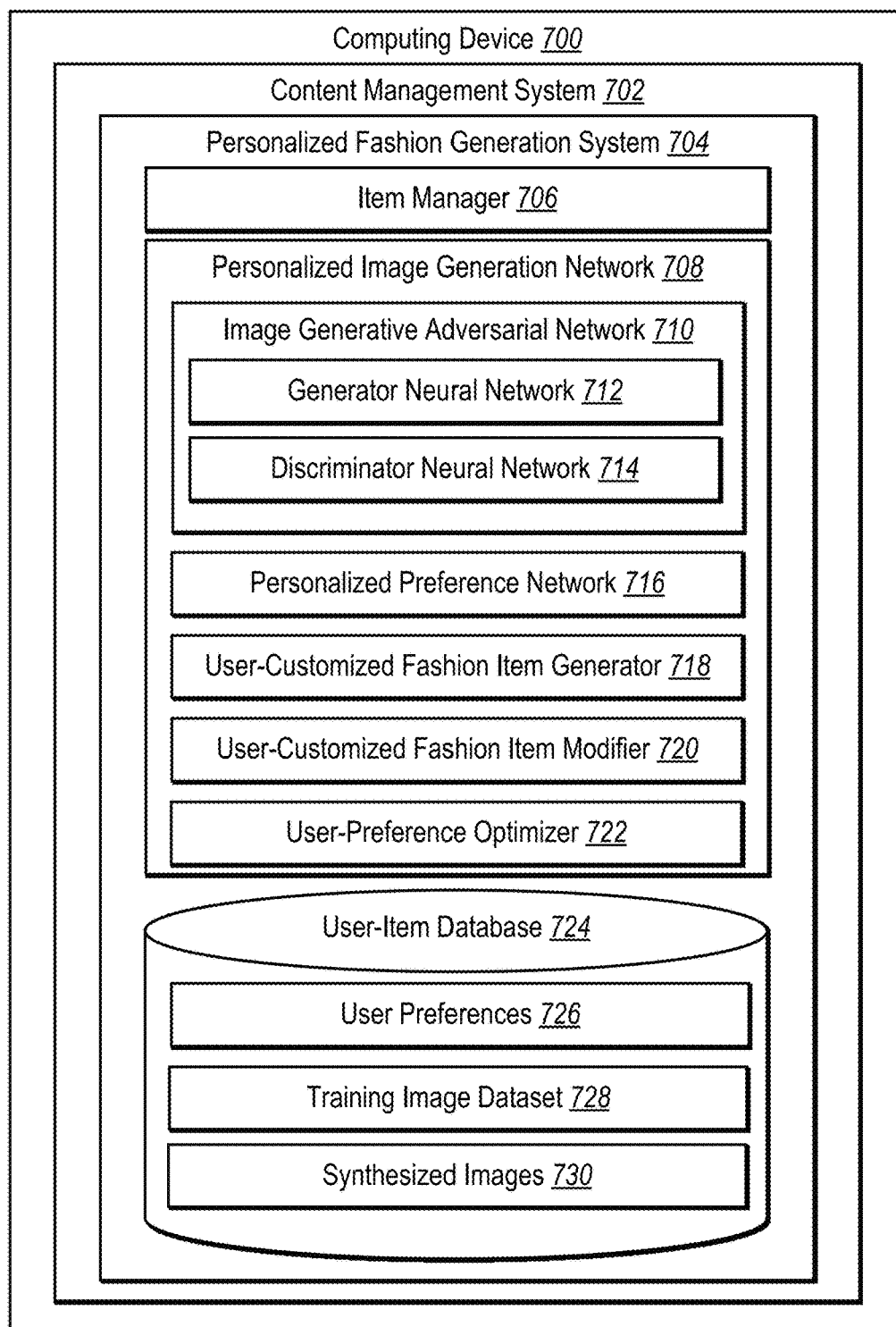
FIG. 7 illustrates a schematic diagram of a personalized fashion generation system in accordance with one or more embodiments.

Referring now to FIG. 7, additional detail will be provided regarding capabilities and components of the personalized fashion generation system in accordance with one or more embodiments. In particular, FIG. 7 shows a schematic diagram of an example architecture of the personalized fashion generation system 704 located within a content management system 702 and hosted on a computing device 700. The personalized fashion generation system 704 can represent one or more embodiments of the personalized fashion generation system described previously.

As shown, the personalized fashion generation system 704 is located on a computing device 700 within a content management system 702. In general, the computing device 700 may represent various types of computing devices. For example, in some embodiments, the computing device 700 is a non-mobile device, such as a desktop or server, or client device. In other embodiments, the computing device 700 is a mobile device, such as a mobile telephone, a smartphone, a PDA, a tablet, a laptop, etc. Additional details with regard to the computing device 700 are discussed below as well as with respect to FIG. 11.

The content management system 702, in general, facilitates the creation, modification, sharing, accessing, storing, and/or deletion of digital content (e.g., items). For example, the content management system 702 stores a repository of fashion items on the computing device 700, such as in the user-item database 724. Additionally, or alternatively, the content management system 702 can access content located remotely, such as fashion items located on a third-party database. Further, in some embodiments, the content management system 702 can be located separately from the computing device 700 and provide content to the computing device 700.

In addition, the content management system 702 can operate in connection with one or more applications to display ranked items on the computing device 700. For example, in one or more embodiments, the content management system 702 provides one or more ranked items personalized to a user to within an online browsing application or another application. In some embodiments, the content management system 702 is part of an application that is access able via a user client device.

As illustrated in FIG. 7, the personalized fashion generation system 704 includes various components. For example, the personalized fashion generation system 704 includes an item manager 706, a personalized image generation network 708, and a user-item database 724. As shown, the personalized image generation network 708 includes an image generative adversarial network 710 (or "GAN 710"), a personalized preference network 716, a user-customized item generator 718, a user-customized item modifier 720, and a user-preference optimizer 722.

In addition, the GAN 710 includes a generator neural network 712 (or "generator 712") and a discriminator neural network 714 (or "discriminator 714"). Further, the user-item database 724 includes user preferences 726, a training image dataset 728 and synthesized images 730. Each of the components listed above is described below.

As shown in FIG. 7, the personalized fashion generation system 704 includes the item manager 706. In one or more embodiments, the item manager 706 can store, access, catalog, classify, filter, create, remove, and/or organize items (e.g., fashion items). In some embodiments, the item manager 706 stores user preferences 726 for items as well as the training image dataset 728 within the user-item database 724 on the computing device 700. In one or more embodiments, the item manager 706 also stores images, such as fashion images of items, on the computing device 700. For instance, the item manager 706 associates and stores images of items with corresponding items.

In addition, the personalized fashion generation system includes a personalized image generation network 708. The personalized image generation network 708 generates synthesized images that are personalized to a user's hidden visual preferences and tastes. For instance, the personalized image generation network 708 provides synthesized images of fashion items to a user based on the user's fashion tastes and preferences. In one or more embodiments, the personalized image generation network 708 is a visually-aware personalized image generation network.

As mentioned above, the personalized image generation network 708 includes a GAN 710, a personalized preference network 716, a user-customized item generator 718, a user-customized item modifier 720, and a user-preference optimizer 722. The personalized image generation network 708 includes the GAN 710. As mentioned above the GAN 710 includes the generator 712 and the discriminator 714. The GAN 710 learns and uses latent code used as input to generate synthesized images via the generator 712, which satisfy a realness threshold determined by the discriminator 714.

As described above, in one or more embodiments, the personalized fashion generation system 704 employs the training image dataset 728 to jointly train the generator 712 and the discriminator 714 to generate synthesized images that appear realistic and have a distribution proportional to the training image dataset 728. In various embodiments, the personalized fashion generation system 704 stores the synthesized images 730 generated by the GAN 710 in the user-item database 724. Additional detail regarding training and employing the GAN 710, including the generator 712 and the discriminator 714, is provided above in connection with FIGS. 2A-2B, 4A, and 5A.

In addition, the personalized image generation network 708 includes a personalized preference network 716. As described above, the personalized preference network 716 identifies the preferences of users (e.g., stored as user preferences 726), such as visual or non-visual latent user features. In addition, in some embodiments, the personalized preference network 716 can identify visual latent item features of images. In these embodiments, the personalized preference network 716 can maximize the latent feature correlations between latent user features and latent item features to determine how favorable an item is to a user. For example, the personalized preference network 716 determines a preference prediction score that predicts a user's preference for a given item. In alternative embodiments, the personalized preference network employs other methods and techniques to determine a user's affinity toward items. Additional detail regarding training and employing the personalized preference network is provided above in connection with FIGS. 3A-3B, 4A, and 5A.

As shown in FIG. 7, the personalized image generation network 708 also includes the user-customized item generator 718. In general, the user-customized item generator 718 employs the GAN 710 and the personalized preference network 716 to generate synthesized images (e.g., stored in the user-item database 724) of new items that uniquely suit a user's preference and that do not currently exist in image datasets (e.g., the training image dataset 728). Additional detail regarding the user-customized item generator 718 is provided with respect to FIGS. 4A-4C.

Further, as shown in FIG. 7, the personalized image generation network 708 also includes the user-customized item modifier 720. In general, the user-customized item modifier 720 employs the GAN 710 and the personalized preference network 716 to generate synthesized images (e.g., stored in the user-item database 724) that are variations of existing images preferred by a user. For example, the user-customized item modifier 720 identifies latent code used as input (e.g., latent input code) that approximates a query image. Further, the user-customized item modifier 720 optimizes the latent code within the trained random latent space of the GAN 710, based on the user's preferences, to enable the GAN 710 to generate modified items tailored to the user. Additional detail regarding the user-customized item modifier 720 is provided with respect to FIGS. 5A-5C.

Additionally, the personalized image generation network 708 includes the user-preference optimizer 722. In general, the user-preference optimizer 722 further improves the look of synthesized images to increase favorability with the user. More particularly, upon identifying latent code, the user-preference optimizer 722 searches adjacent locations within the learned random latent space to discover if any adjacent latent code yields a higher preference prediction score for the user. Additional detail regarding the user-customized item modifier 720 is provided with respect to FIGS. 5A and 6.

As shown, the personalized fashion generation system 704 includes the user-item database 724. In one or more embodiments, the user-item database 724 includes the user preferences 726 that can include latent user features, user feedback, metadata, and/or other information regarding the user. Further, as mentioned above, the user-item database 724 includes the training image dataset 728 and synthesized images 730 generated for a user, which are each described above.

Each of the components 706-730 of the personalized fashion generation system 704 can include software, hardware, or both. For example, the components 706-730 can include one or more instructions stored on a computer-readable storage medium and executable by processors of one or more computing devices, such as a client device or server device. When executed by the one or more processors, the computer-executable instructions of the personalized fashion generation system 704 can cause the computing device(s) to perform the feature learning methods described herein. Alternatively, the components 706-730 can include hardware, such as a special-purpose processing device to perform a certain function or group of functions. Alternatively, the components 706-730 of the personalized fashion generation system 704 can include a combination of computer-executable instructions and hardware.

Furthermore, the components 706-730 of the personalized fashion generation system 704 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 706-730 may be implemented as a stand-alone application, such as a desktop or mobile application. Furthermore, the components 706-730 may be implemented as one or more web-based applications hosted on a remote server. The components 706-730 may also be implemented in a suite of mobile device applications or "apps." To illustrate, the components 706-730 may be implemented in an application, including but not limited to ADOBE® CREATIVE CLOUD® software. "ADOBE" and "CREATIVE CLOUD" are either registered trademarks or trademarks of Adobe Systems Incorporated in the United States and/or other countries.

Figure 8:
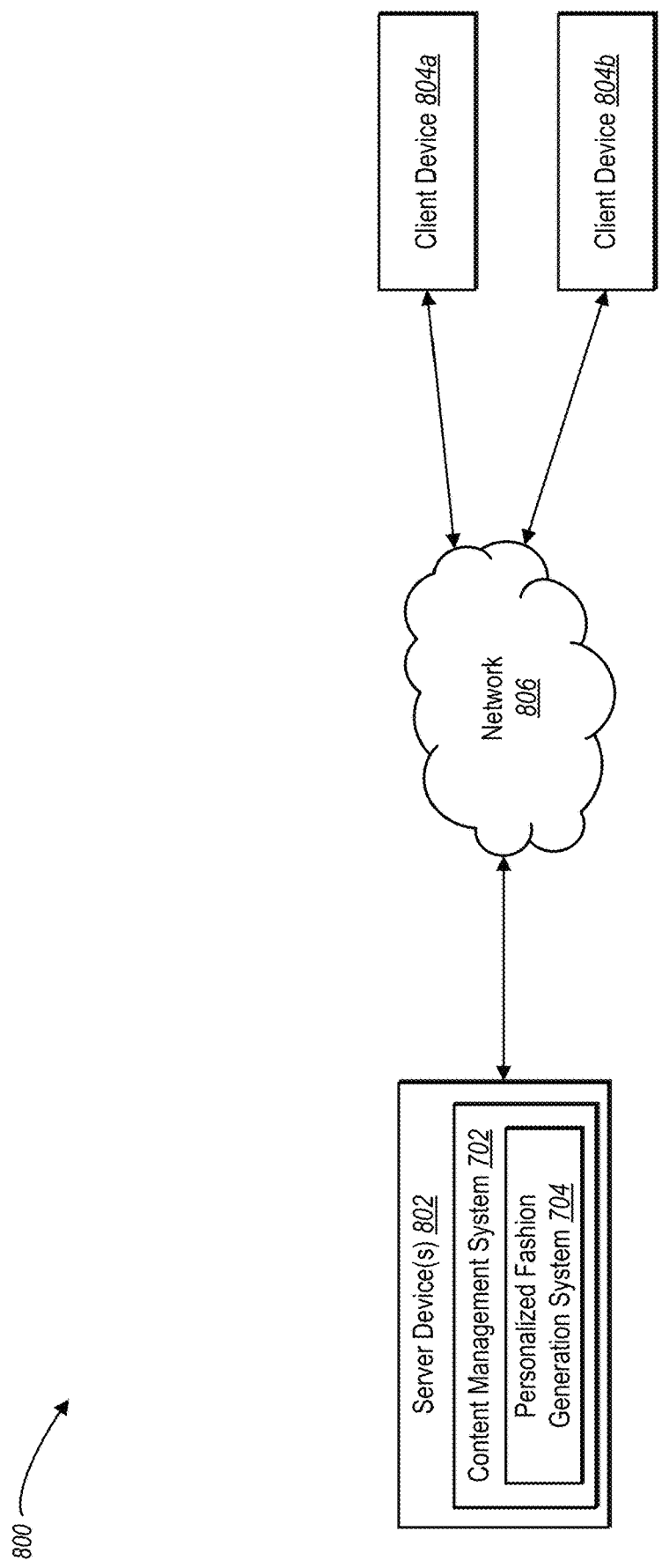
FIG. 8 illustrates a schematic diagram of an example environment in which the personalized fashion generation system may be implemented in accordance with one or more embodiments.

FIG. 8 illustrates a schematic diagram of an environment 800 in which the personalized fashion generation system 704 may be implemented in accordance with one or more embodiments. In one or more embodiments, the environment 800 includes various computing devices including server device(s) 802 and one or more client devices 804a, 804b. In addition, the environment 800 includes a network 806. The network 806 may be any suitable network over which the computing devices can communicate. Example networks are discussed in more detail below with regard to FIG. 11.

As illustrated in FIG. 8, the environment 800 includes the server device(s) 802, which may comprise any computing device, such as one or more of the computing devices described below in relation to FIG. 11. In addition, the server device(s) 802 includes the content management system 702 and the personalized fashion generation system 704, which are described previously. For example, as described above, the personalized fashion generation system 704 can train and apply a visually-aware personalized image generation network to accurately recommend personalized fashion items to a user with which the user has not yet interacted.

In addition, the environment 800 includes the one or more client devices 804a, 804b. The client devices 804a, 804b may comprise any computing device, such as the computing device described below in relation to FIG. 11. As described above, the one or more client devices 804a, 804b can employ the trained visually-aware personalized image generation network to identify and accurately recommend personalized fashion items to a user.

As illustrated, in one or more embodiments, the server device(s) 802 can include all, or a portion of, the personalized fashion generation system 704. In particular, the personalized fashion generation system 704 can comprise an application running on the server device(s) 802 or a portion of a software application that can be downloaded from the server device(s) 802. For example, the personalized fashion generation system 704 can include a web hosting application that allows a client device 804a to interact with content hosted on the server device(s) 802. To illustrate, in one or more embodiments of the environment 800, the client device 804a accesses a web page supported by the server device(s) 802. In particular, the client device 804a can run an application to allow a user to access, view, select, and/or identify fashion items (including fashion items personalized based on a user's preferences) within a web page or website hosted at the server device(s) 802, as explained previously.

Although FIG. 8 illustrates a particular arrangement of the server device(s) 802, the client devices 804a, 804b and the network 806, various additional arrangements are possible. For example, while FIG. 8 illustrates the one or more client devices 804a, 804b communicating with the server device(s) 802 via the network 806, in one or more embodiments a single client device may communicate directly with the server device(s) 802, bypassing the network 806.

Similarly, although the environment 800 of FIG. 8 is depicted as having various components, the environment 800 may have additional or alternative components. For example, the personalized fashion generation system 704 can be implemented on multiple computing devices. In particular, the personalized fashion generation system 704 may be implemented in whole by the server device(s) 802 or the personalized fashion generation system 704 may be implemented in whole by the client device 804a. Alternatively, the personalized fashion generation system 704 may be implemented across multiple devices or components (e.g., utilizing the server device(s) 802 and the one or more client devices 804a, 804b).

Turning now to FIG. 7 and FIG. 8, additional detail is provided with respect to evaluating the embodiments of the personalized fashion generation system. As mentioned above, the personalized fashion generation system outperforms conventional systems in head-to-head evaluations with respect to fashion recommendations for a user. Indeed, the personalized fashion generation system improves current methods to predict and provide ranked personalized fashion recommendations. Additional results of testing and evaluating the personalized fashion generation system are described below with respect to FIG. 7.

FIGS. 1-8, the corresponding text, and the examples provide a number of different methods, systems, devices, and non-transitory computer-readable media of the personalized fashion generation system. In addition to the foregoing, one or more embodiments can also be described in terms of flowcharts comprising acts for accomplishing a particular result. For example, FIG. 9 and FIG. 10 may be performed with more or fewer acts. Further, the acts may be performed in differing orders. Additionally, the acts described herein may be repeated or performed in parallel with one another or parallel with different instances of the same or similar acts.

Figure 9:
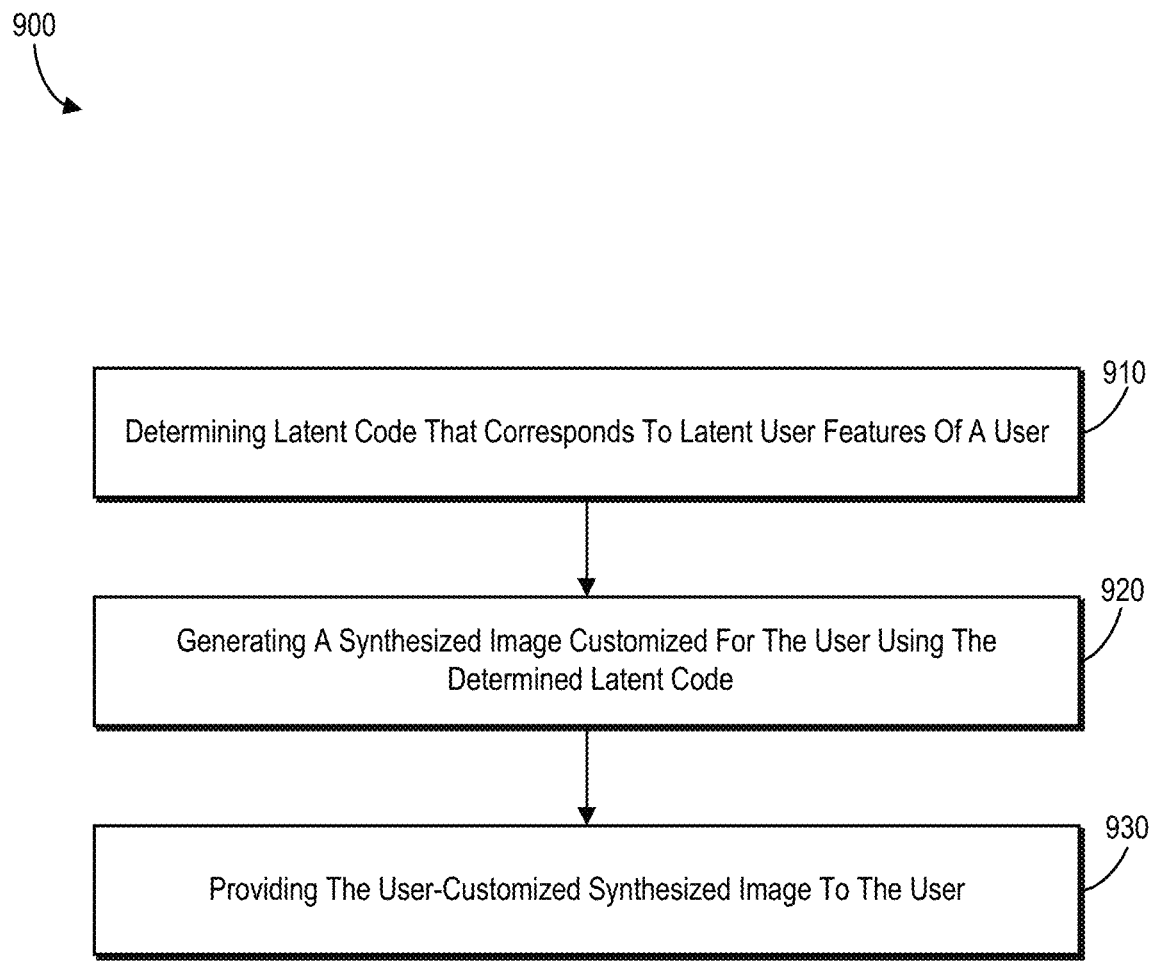
FIG. 9 illustrates a flowchart of a series of acts for designing and synthesizing new user-customized images based on visually-aware user preferences in accordance with one or more embodiments.

As mentioned, FIG. 9 illustrates a flowchart of a series of acts 900 for designing and synthesizing new user-customized images based on visually-aware user preferences in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

In one or more embodiments, the series of acts 900 is implemented on one or more computing devices, such as the computing device 700 or the server device(s) 802. In addition, in some embodiments, the series of acts 900 is implemented in a digital environment for recommending fashion items to a user. For example, the series of acts 900 is implemented on a computing device having memory that stores an image generative adversarial network trained to generate realistic images of items. In additional embodiments, the computing device also stores a preference predictor network trained to determine preferences of individual users. In various embodiments, the images correspond to fashion items.

The series of acts 900 includes an act 910 of determining latent code that corresponds to latent user features of a user. In particular, the act 910 can involve determining, using the preference predictor network and the image generative adversarial network, a latent code from a plurality of latent codes that corresponds to latent user features of a user. In one or more embodiments, the act 910 includes identifying the plurality of inputs within random latent space of the trained image generative adversarial network (or GAN), from which the latent code is identified. Indeed, in some embodiments, the plurality of latent codes includes random noise vectors (e.g., latent code combined with random noise) within random latent space of the image generative adversarial network.

In one or more embodiments, the act 910 is based on iteratively searching for low-dimensional latent code that maximizes the preference predictor score for the user, as calculated by the personalized preference network. In some embodiments, the act 910 includes employing a hyperparameter that controls a trade-off between user preference score and image quality.

The series of acts 900 includes an act 920 of generating a synthesized image customized for the user using the determined latent code. In particular, the act 920 can involve generating a realistic synthesized image customized for the user using the determined latent code and the image generative adversarial network. In one or more embodiments, the act 920 includes employing a generator neural network of the image generative adversarial network to generate the synthesized image and the discriminator neural network of the image generative adversarial network to verify the image quality of the synthesized image. In various embodiments, the realistic synthesized image customized for the user is a synthesized image of a new fashion item generated for the user.

As shown, the series of acts also includes an act 930 of providing the user-customized synthesized image to the user. In particular, the act 930 can involve providing the realistic synthesized image customized for the user to a client device associated with the user. In one or more embodiments, the act 930 includes generating a plurality of realistic synthesized images customized for the user and providing the plurality of realistic synthesized images customized for the user based on employing a probabilistic selection algorithm to increase diversity among the provided plurality of realistic synthesized images customized for the user.

Additionally, in some embodiments, the image generative adversarial network includes a generator neural network trained to generate synthesized images of fashion items and a discriminator neural network trained using the synthesized images and a corpus of real images (e.g., images of fashion items) to determine when the generated synthesized images of fashion items resemble realistic synthesized images of fashion items (e.g., in both appearance and distribution). In various embodiments, the image generative adversarial network is trained using a corpus of images of fashion items corresponding to fashion categories to identify latent representations of fashion characteristics.

In additional embodiments, the image generative adversarial network trains in an unsupervised manner using the corpus of fashion images. Also, the image generative adversarial network alternates training the generator neural network and the discriminator neural network using objective functions via back propagation and least squares loss. Further, the trained generator neural network generates synthesized images of fashion items following the same distribution of images from the corpus of fashion items.

In some embodiments, the preference predictor network determines, for the user and based on latent user features of the user, a preference predictor score for each image generated by the image generative adversarial network. In various embodiments, the series of acts 900 can include optimizing the determined latent code by employing gradient ascent within a constrained space to identify an optimized latent code that yields a higher preference predictor score from the preference predictor network than the determined latent code.

Further, the series of acts 900 can also include repeating or iterating the acts of identifying the optimized latent code. In particular, the series of acts 900 can include randomizing the initial position of the determined latent code within random latent space of the image generative adversarial network for a predetermined number of iterations, optimizing the latent code based on the latent user features of the user, and selecting the optimized latent code that yields the higher preference predictor score for the user.

Figure 10:
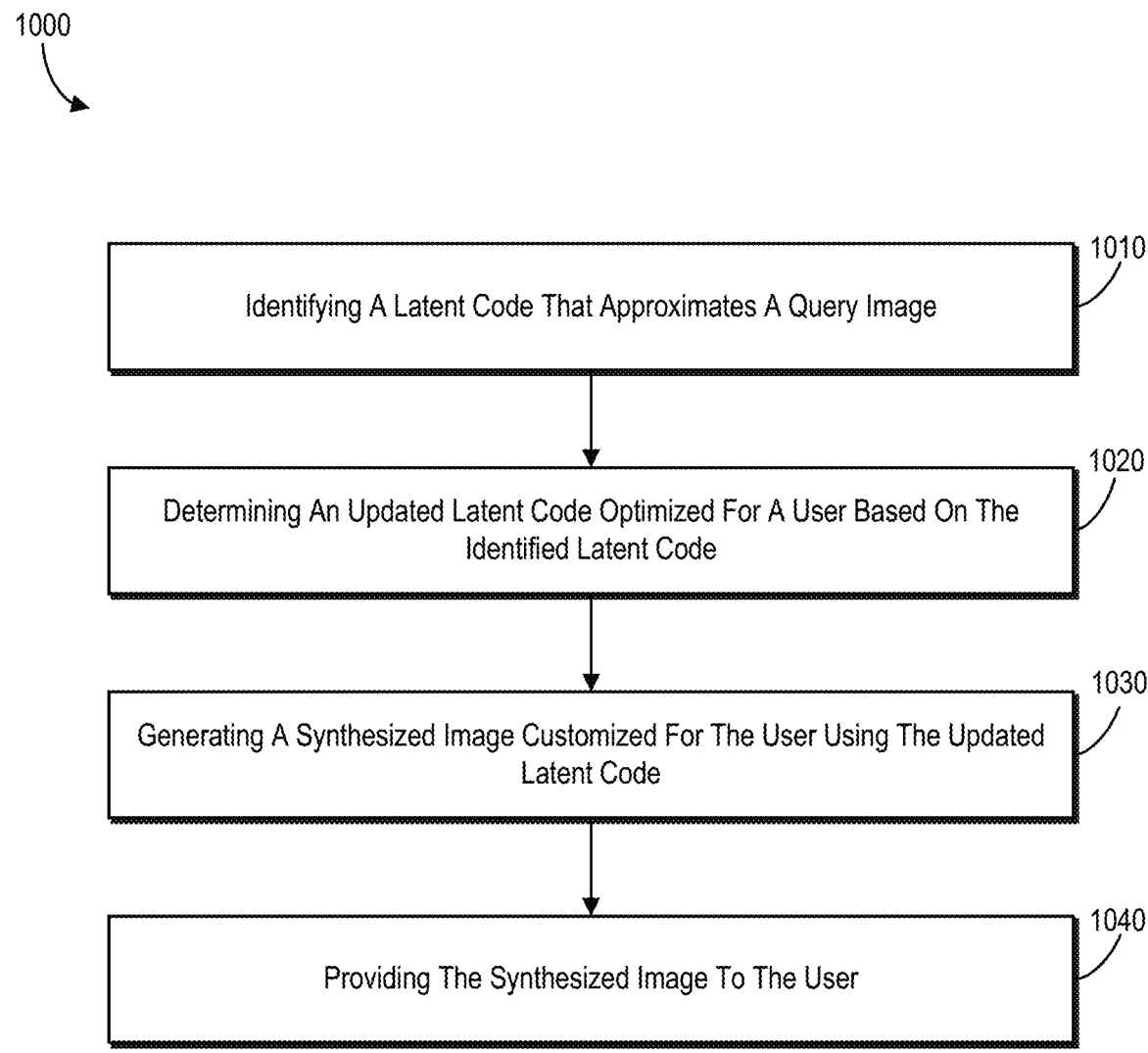
FIG. 10 illustrates a flowchart of a series of acts for synthesizing modified images of existing items based on visually-aware user preferences in accordance with one or more embodiments.

As mentioned previously, FIG. 10 illustrates a flowchart of a series of acts 1000 for synthesizing modified images of existing items based on visually-aware user preferences in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In one or more embodiments, a system can perform the acts of FIG.

10. In some embodiments, the series of acts 1000 is implemented by a computing system on one or more computing devices, such as the computing device 700 or the server device(s) 802.

As shown, the series of acts 1000 includes an act 1010 of identifying a latent code that approximates a query image. In particular, the act 1010 can involve identifying a latent code that causes an image generative adversarial network trained to generate realistic synthesized images of items to generate an image that approximates a query image. In some embodiments, the act 1010 includes iteratively searching for a latent code having the smallest $L_1$ distance between a corresponding image generated by the trained image generative adversarial network and the query image. In one or more embodiments, the query image includes an image of a fashion item of a given fashion category. In various embodiments, the image generative adversarial network is trained using an image dataset that corresponds to a subcategory of articles of clothing or fashion accessories In addition, the series of acts 1000 includes an act 1020 of determining an updated latent code optimized for a user based on the identified latent code. In particular, the act 1020 can involve determining an updated latent code optimized for the user based on the identified latent code, a preference predictor network trained to identify latent user features for the user, and the image generative adversarial network. In some embodiments, the act 1020 includes iteratively searching for additional latent code in adjacent random latent space that yields a higher preference prediction score by the preference predictor network than the latent code and selecting the additional latent code that yields the highest preference prediction score as the updated latent code for the user. In one or more embodiments, the act 1020 also includes constraining the latent code by a hyperbolic tangent before determining the updated latent code.

The series of acts 1000 also includes an act 1030 of generating a synthesized image customized for the user using the updated latent code. In particular, the act 1030 can involve generating a realistic synthesized image of the item customized for the user using the updated latent code and the image generative adversarial network. In one or more embodiments, the act 930 includes employing a generator neural network of the image generative adversarial network to generate the realistic synthesized image and the discriminator neural network of the image generative adversarial network verifies the realness and/or image quality of the synthesized image.

In addition, the series of acts 1000 includes an act 1040 of providing the synthesized image to the user. In particular, the act 1030 can involve providing the realistic synthesized image of the item customized for the user to a client device associated with the user. In some embodiments, the realistic synthesized image of the item customized for the user yields a higher preference prediction score by the preference predictor network than the query image.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the personalized fashion generation system to train and employ a visually-aware personalized image generation network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
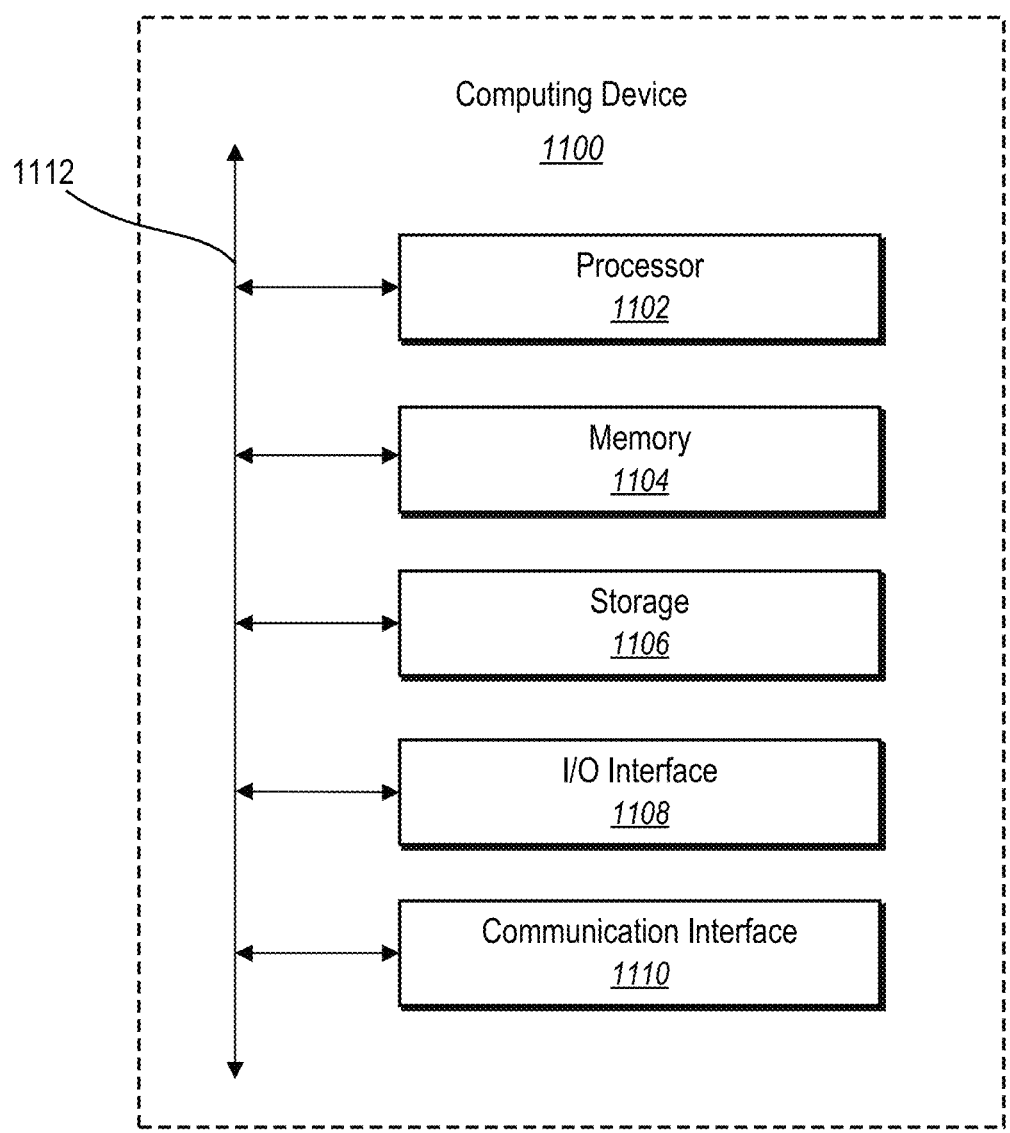
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., computing device 700, server device(s) 802, and client devices 804a-b). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 or ("I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (MC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system for synthesizing user-customized images based on latent user preferences comprising:
    a memory comprising:
        an image generative adversarial network trained to generate realistic images of items; and
        a preference predictor network trained to determine visual preferences of individual users;
    at least one processor; and
    at least one non-transitory computer-readable storage medium storing instructions that, when executed by the at least one processor, cause the system to:
    generate a first realistic synthesized image utilizing the image generative adversarial network based on a latent code identified from a plurality of latent codes;
    determine a first preference prediction score for the first realistic synthesized image utilizing the preference predictor network based on visual latent user features of a user;
    generate a second realistic synthesized image utilizing the image generative adversarial network that is customized for the user based on a modified latent code modified according to the first preference prediction score, wherein the preference predictor network generates a second preference prediction score for the second realistic synthesized image that is greater than the first preference prediction score; and
    provide the second realistic synthesized image customized for the user to a client device associated with the user.

2. The system of claim 1, wherein:
    the image generative adversarial network is trained utilizing a corpus of images of fashion items corresponding to fashion categories to identify latent representations of visual fashion characteristics; and
    the realistic synthesized second image customized for the user comprises a synthesized image of a new fashion item generated for the user.

3. The system of claim 2, further comprising instructions that, when executed by the at least one processor, cause the system to identify the plurality of latent codes within random latent space of the image generative adversarial network.

4. The system of claim 2, wherein the image generative adversarial network comprises:
    a generator neural network trained on the corpus of fashion images to generate synthesized images of fashion items; and
    a discriminator neural network trained on the corpus of fashion images to determine when generated synthesized images of new fashion items resemble real images of fashion items.

5. The system of claim 4, wherein
    the image generative adversarial network trains in an unsupervised manner using the corpus of fashion images;
    the image generative adversarial network alternates training the generator neural network and the discriminator neural network using objective functions via back propagation and least squares loss; and
    the trained generator neural network generates synthesized images of fashion items following a same distribution of images from the corpus of fashion items.

6. The system of claim 1, further comprising instructions that, when executed by the at least one processor, cause the system to determine the modified latent code from the plurality of latent codes based on utilizing a hyper-parameter that controls a trade-off between preference prediction scores and image quality.

7. The system of claim 1, further comprising utilizing the preference predictor network to determine the first preference prediction score for the first realistic synthesized image based on correlating visual latent user features of the user with visual latent item features generated from the first realistic synthesized image by the image generative adversarial network.

8. The system of claim 7, further comprising instructions that, when executed by the at least one processor, cause the system to determine the modified latent code based on iteratively searching for a low-dimensional latent code within the plurality of latent codes that maximizes the preference prediction score for the user at the preference predictor network.

9. The system of claim 7, further comprising instructions that, when executed by the at least one processor, cause the system to determine the modified latent code by utilizing gradient ascent within a constrained space to identify an optimized latent code that yields a higher preference prediction score from the preference predictor network than the latent code.

10. The system of claim 9, further comprising instructions that, when executed by the at least one processor, cause the system to repeat identifying the modified latent code by:
    randomizing initial positions of latent codes within random latent space of the image generative adversarial network for a predetermined number of iterations;
    based on the visual latent user features of the user, identify one or more optimized latent codes within the random latent space that yield higher preference prediction score for the user than the first preference prediction score; and selecting the modified latent code from the one or more optimized latent codes based on the higher preference prediction scores for the user.

11. The system of claim 1, wherein the plurality of latent codes comprises latent codes combined with random noise vectors within random latent space of the image generative adversarial network.

12. The system of claim 1, further comprising instructions that, when executed by the at least one processor, cause the system to:
generate a plurality of realistic synthesized images customized for the user; and
provide the plurality of realistic synthesized images customized for the user based on employing a probabilistic selection algorithm to increase diversity among the provided plurality of realistic synthesized images customized for the user.

13. A non-transitory computer-readable medium storing instructions that, when executed by at least one processor, cause a computer system to:
generate a first realistic synthesized image at an image generative adversarial network utilizing a latent code identified from a plurality of latent codes;
utilize a preference predictor network to determine a first preference prediction score for the first realistic synthesized image based on correlating visual latent user features of a user with visual latent item features generated from the first realistic synthesized image;
modify the latent code at the image generative adversarial network based on the first preference prediction score;
generate a second realistic synthesized image customized for the user at the image generative adversarial network utilizing the modified latent code, wherein the preference predictor network generates a second preference prediction score for the second realistic synthesized image that is greater than the first preference prediction score; and
provide the second realistic synthesized image customized for the user to a client device associated with the user.

14. The non-transitory computer-readable of claim 13, further comprising instructions that, when executed by at least one processor, cause a computer system to modify the latent code by iteratively searching for one or more latent codes within random latent space of the image generative adversarial network that maximize preference a predictor score for the user at the preference predictor network.

15. The non-transitory computer-readable of claim 13, wherein the image generative adversarial network comprises:
a generator neural network trained on a corpus of fashion images to generate synthesized images of fashion items; and
a discriminator neural network trained on the corpus of fashion images to determine when generated synthesized images of new fashion items resemble real images of fashion items.

16. The non-transitory computer-readable of claim 15, further comprising instructions that, when executed by at least one processor, cause the computer system to modify, by the generator neural network of the image generative adversarial network, the latent code based on the first preference prediction score.

17. The non-transitory computer-readable of claim 15, wherein:
the image generative adversarial network is trained in an unsupervised manner utilizing the corpus of fashion images;
the image generative adversarial network alternates training the generator neural network and the discriminator neural network utilizing objective functions via back propagation and least squares loss; and
the trained generator neural network generates synthesized images of fashion items following a same distribution of images from the corpus of fashion items.

18. In a digital medium environment for generating synthesized items customized to individual users, a computer-implemented method comprising:
generating a first realistic synthesized image utilizing an image generative adversarial network based on a latent code identified from a plurality of latent codes;
determining, by at least one processer, a first preference prediction score for the first realistic synthesized image utilizing a preference predictor network based on visual latent user features of a user;
generating a second realistic synthesized image customized for the user utilizing the image generative adversarial network based on a modified latent code that is modified according to the first preference prediction score; and
based on determining that the second realistic synthesized image generates a second preference prediction score that is greater than the first preference prediction score, providing the second realistic synthesized image customized for the user to a client device associated with the user.

19. The computer-implemented method of claim 18, further comprising generating additional realistic synthesized images that are customized for the user before generating the second realistic synthesized image, wherein the image generative adversarial network generates the additional realistic synthesized images until preference prediction scores for the additional realistic synthesized images satisfy a preference prediction threshold.

20. The computer-implemented method of claim 19, further comprising:
determining a third preference prediction score for third realistic synthesized image utilizing the preference predictor network based on the visual latent user features of the user; and
wherein providing the second realistic synthesized image to the client device associated with the user is further based on determining that the second realistic synthesized image generates a second preference prediction score that is greater than the third preference prediction score.

* * * * *